(12) United States Patent
Kurata et al.

(10) Patent No.: US 9,626,958 B2
(45) Date of Patent: *Apr. 18, 2017

(54) SPEECH RETRIEVAL METHOD, SPEECH RETRIEVAL APPARATUS, AND PROGRAM FOR SPEECH RETRIEVAL APPARATUS

(71) Applicant: SINOEAST CONCEPT LIMITED, Hongkong (HK)

(72) Inventors: Gakuto Kurata, Tokyo (JP); Tohru Nagano, Tokyo (JP); Masafumi Nishimura, Kanagawa (JP)

(73) Assignee: SINOEAST CONCEPT LIMITED, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,683

(22) Filed: May 27, 2016

(65) Prior Publication Data

US 2016/0275940 A1 Sep. 22, 2016

Related U.S. Application Data

(63) Continuation of application No. 14/745,912, filed on Jun. 22, 2015, now Pat. No. 9,373,328, which is a
(Continued)

(30) Foreign Application Priority Data

Apr. 21, 2014 (JP) .................. 2014-087325

(51) Int. Cl.
*G10L 15/02* (2006.01)
*G10L 15/187* (2013.01)
(Continued)

(52) U.S. Cl.
CPC .............. *G10L 15/02* (2013.01); *G10L 15/04* (2013.01); *G10L 15/08* (2013.01); *G10L 15/187* (2013.01);
(Continued)

(58) Field of Classification Search
CPC .......................... G10L 2015/088; G10L 15/05
See application file for complete search history.

(56) References Cited

U.S. PATENT DOCUMENTS 6,907,397 B2 * 6/2005 Kryze ............... G06F 17/30026
704/201
7,177,795 B1 * 2/2007 Chen ................... G10L 15/1815
704/1
(Continued)

FOREIGN PATENT DOCUMENTS

| JP | 2008262279 A | 10/2008 |
|---|---|---|
| JP | 2009128508 A | 6/2009 |
| JP | 2011175046 A | 9/2011 |

OTHER PUBLICATIONS

Yu, Peng, et al. "Searching the audio notebook: keyword search in recorded conversations." Proceedings of the conference on Human Language Technology and Empirical Methods in Natural Language Processing. Association for Computational Linguistics, 2005.*
(Continued)

*Primary Examiner* — Brian Albertalli
(74) *Attorney, Agent, or Firm* — Anova Law Group, PLLC

(57) ABSTRACT

A method for speech retrieval includes acquiring a keyword designated by a character string, and a phoneme string or a syllable string, detecting one or more coinciding segments by comparing a character string that is a recognition result of word speech recognition with words as recognition units performed for speech data to be retrieved and the character string of the keyword, calculating an evaluation value of each of the one or more segments by using the phoneme string or the syllable string of the keyword to evaluate a phoneme string or a syllable string that is recognized in each of the detected one or more segments and that is a recognition result of phoneme speech recognition with phonemes
(Continued)

or syllables as recognition units performed for the speech data, and outputting a segment in which the calculated evaluation value exceeds a predetermined threshold.

13 Claims, 11 Drawing Sheets

Related U.S. Application Data continuation of application No. 14/692,105, filed on Apr. 21, 2015, now Pat. No. 9,378,736.

(51) Int. Cl.
  *G10L 15/04* (2013.01)
  *G10L 25/51* (2013.01)
  G10L 15/08 (2006.01)
(52) U.S. Cl.
  CPC ........ *G10L 25/51* (2013.01); *G10L 2015/025* (2013.01); *G10L 2015/027* (2013.01); *G10L 2015/088* (2013.01)

(56) References Cited

U.S. PATENT DOCUMENTS

| | | | | |
|---|---|---|---|---|
| 7,212,968 B1* | 5/2007 | Garner | ................ | G06F 17/3043 704/231 |
| 7,240,003 B2* | 7/2007 | Charlesworth | ... | G06F 17/30681 704/254 |
| 7,310,600 B1* | 12/2007 | Garner | .................... | G10L 15/12 704/234 |
| 7,769,587 B2* | 8/2010 | Cardillo | ............ | G06F 17/30681 704/243 |
| 7,809,568 B2* | 10/2010 | Acero | ............... | G06F 17/30746 704/257 |
| 7,831,428 B2* | 11/2010 | Chelba | .............. | G06F 17/30746 704/270 |
| 8,131,545 B1* | 3/2012 | Moreno | .................. | G10L 15/04 704/235 |
| 8,670,977 B2* | 3/2014 | Saraclar | ................ | G10L 15/142 704/231 |
| 2002/0010575 A1* | 1/2002 | Haase | ................. | G10L 15/1807 704/205 |
| 2002/0052740 A1* | 5/2002 | Charlesworth | ... | G06F 17/30038 704/220 |
| 2003/0187649 A1* | 10/2003 | Logan | ............... | G06F 17/30017 704/260 |
| 2006/0074898 A1* | 4/2006 | Gavalda | ............ | G06F 17/30684 |
| 2007/0143110 A1* | 6/2007 | Acero | ..................... | G10L 15/05 704/251 |
| 2007/0156843 A1* | 7/2007 | Sagen | ............ | H04N 21/234309 709/217 |
| 2007/0271241 A1* | 11/2007 | Morris | ..................... | G10L 15/26 |
| 2008/0059170 A1* | 3/2008 | Bloebaum | ......... | G06F 17/30746 704/233 |
| 2008/0082330 A1* | 4/2008 | Blair | ................. | H04M 3/42221 704/235 |
| 2008/0162125 A1* | 7/2008 | Ma | .................... | G06F 17/30746 704/222 |
| 2008/0270138 A1* | 10/2008 | Knight | .............. | G06F 17/30026 704/260 |
| 2009/0164217 A1* | 6/2009 | Arrowood | ............... | G10L 15/14 704/254 |
| 2010/0121642 A1* | 5/2010 | Hori | .................. | G06F 17/30746 704/254 |
| 2010/0324900 A1* | 12/2010 | Faifkov | ................... | G10L 15/12 704/254 |
| 2011/0071833 A1* | 3/2011 | Shi | ....................... | G06F 17/3074 704/251 |
| 2012/0036159 A1* | 2/2012 | Katsurada | ............... | G10L 15/12 707/780 |
| 2012/0078626 A1* | 3/2012 | Tsai | ........................ | G10L 15/26 704/235 |
| 2012/0116766 A1* | 5/2012 | Wasserblat | .............. | G10L 15/08 704/254 |
| 2012/0239401 A1 | 9/2012 | Arakawa | | |
| 2014/0067373 A1* | 3/2014 | Wasserblat | .............. | G10L 15/02 704/9 |
| 2014/0188475 A1* | 7/2014 | Lev-Tov | ........... | G06F 17/30389 704/254 |
| 2015/0058006 A1* | 2/2015 | Proux | ..................... | G10L 15/26 704/235 |
| 2015/0255059 A1* | 9/2015 | Ide | .................... | G06F 17/30755 704/254 |
| 2015/0255060 A1* | 9/2015 | Tomita | .................... | G10L 15/02 704/254 |
| 2015/0279358 A1* | 10/2015 | Kingsbury | ............ | G10L 15/083 704/257 |

OTHER PUBLICATIONS

Zhou, Zheng-Yu, et al. "Towards spoken-document retrieval for the internet: Lattice indexing for large-scale web-search architectures." Proceedings of the main conference on Human Language Technology Conference of the North American Chapter of the Association of Computational Linguistics. Association for Computational Linguistics, 2006.*

Mertens, Timo, and Daniel Schneider. "Efficient subword lattice retrieval for German spoken term detection." Acoustics, Speech and Signal Processing, 2009. ICASSP 2009. IEEE International Conference on. IEEE, 2009.*

Kanda, Naoyuki, et al. "Open-vocabulary keyword detection from super-large scale speech database." Multimedia Signal Processing, 2008 IEEE 10th Workshop on. IEEE, 2008.*

Dubois, Corentin, and Delphine Charlet. "Using textual information from LVCSR transcripts for phonetic-based spoken term detection." Acoustics, Speech and Signal Processing, 2008. ICASSP 2008. IEEE International Conference on. IEEE, 2008.*

Yu, Peng, et al. "Vocabulary-independent indexing of spontaneous speech." Speech and Audio Processing, IEEE Transactions on 13.5 (2005): 635-643.*

Kohler, J., Larson, M., Jong de, F.M.G., Kraaij, W., Ordelman R.J.F., Proceedings of the ACM SIGIR Workshop 'Searching Spontaneous Conversational Speech', held in conjunction with the 31th Annual International ACM SIGIR Conference, Jul. 24, 2008, Singapore.*

List of IBM Patents or Patent Applications Treated as Related dated May 27, 2016.

Iwami, K., et al., "Out-Of-Vocabulary Term Detection by N-GRAM Array With Distance From Continuous Syllable Recognition Results," Spoken Language Technology Workshop, Dec. 2010. (pp. 200-205).

Soltau, H. et al., "The IBM Attila Speech Recognition Toolkit," Spoken Language Technology Workshop, Dec. 2010. (pp. 97-102).

* cited by examiner

FIG. 2A

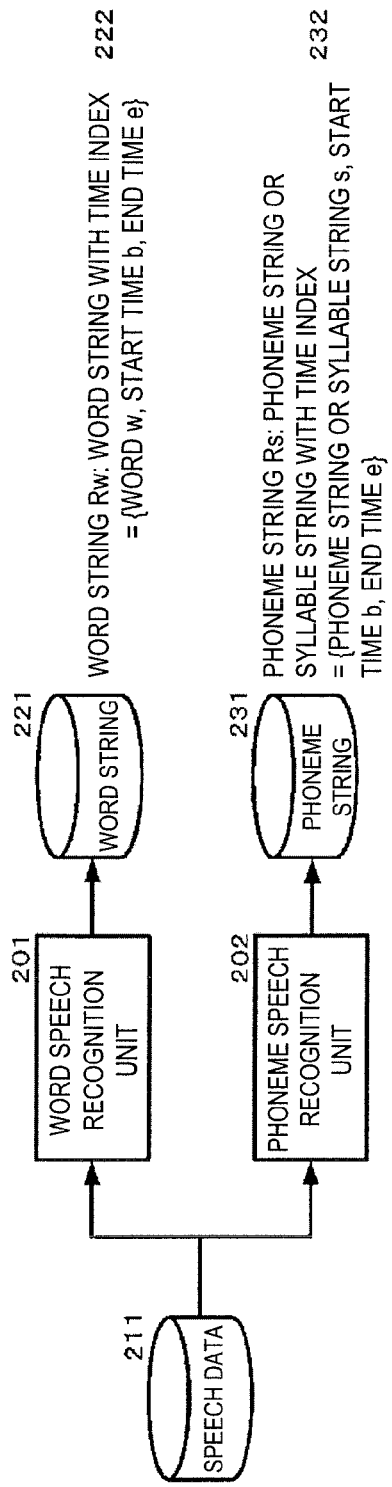

WORD STRING Rw = ... not just desserts on Wednesdays ... ... cookies to quick and easy desserts, ...

PHONEME STRINGS Rs = Rs[1], Rs[2], Rs[3], ..., Rs[N]  ; N-best

Rs[1] = ... N AA T JH AH S T D EH Z ER T    AA N W EH N Z D EY Z  ...    UH K IY T AX K W IH K AE N D IY Z IY D IH Z ER T S ...
Rs[2] = ... N AA T JH AH S T    D IH Z ER T    AA N W EH N Z D EY Z ...    UH K IY T AX K W IH K AE N D IY Z IY D IH Z ER T ...
Rs[3] = ... AA T JH AA S T    D EH Z ER T S    AA N W EH N Z D EY   ...    UH K IY T AX K W IH K AE N D IY Z IY D IH Z ER T ...
...
Rs[N] = ...

PHONEME STRING Rs = Rs[1]  ; 1-best

Rs = ... N AA T JH AH S T D EH Z ER T    AA N W EH N Z D EY Z  ...    UH K IY T AX K W IH K AE N D IY Z IY D IH Z ER T S ...

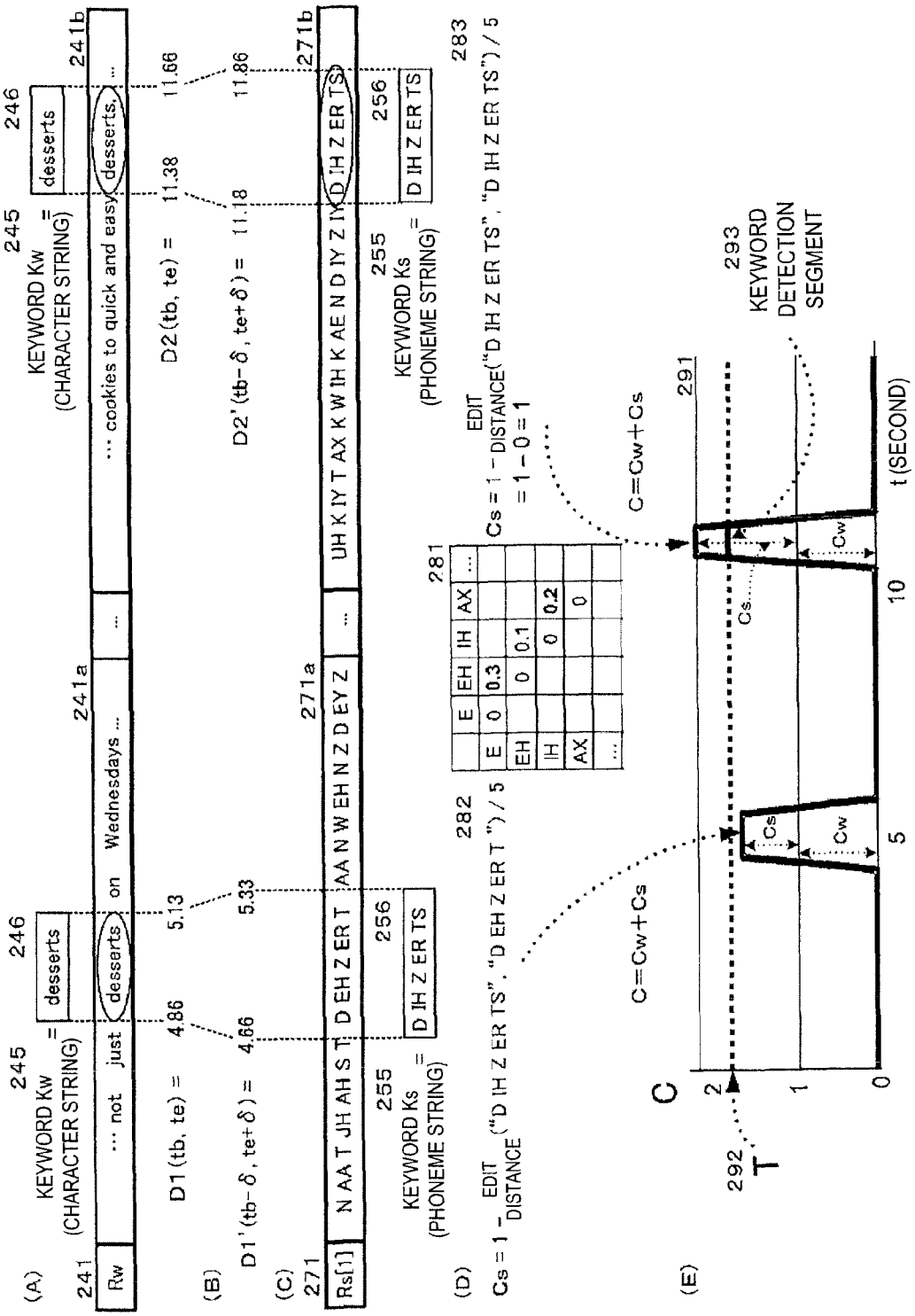

us 9,626,958 B2

SPEECH RETRIEVAL METHOD, SPEECH RETRIEVAL APPARATUS, AND PROGRAM FOR SPEECH RETRIEVAL APPARATUS

RELATED APPLICATION DATA

This application is a Continuation application of co-pending U.S. patent application Ser. No. 14/745,912 filed on Jun. 22, 2015 which is a Continuation application of co-pending U.S. patent application Ser. No. 14/692,105 filed on Apr. 21, 2015, which claims priority under 35 U.S.C. §119 from Japanese Patent Application No. 2014-087325 filed Apr. 21, 2014, all of which are incorporated herein by reference in their entirety.

BACKGROUND

Technical Field

The present invention relates to a method for retrieving speech from speech data. Particularly, the present invention relates to a method for retrieving a character string designated by a keyword from speech data.

Related Art

In a call monitoring operation at a call center, for example, a specific word or an inappropriate statement (hereinafter, also simply called "keyword") is checked from a large number of speech calls to improve the quality of the call center or to evaluate communicators (e.g., customer service representatives ("CSR") or telephone sales representatives ("TSR")).

In recent years, call monitoring using speech recognition is implemented, and monitoring can be performed for all calls.

The speech recognition, particularly large vocabulary continuous speech recognition ("LVCSR"), is used in various fields, such as to make a transcript at a call center, to automatically create a record in a court, and to create a caption for a video lecture in college.

In Patent Literature 1, language models, divided into language units, and acoustic models, modeling features of speeches, are referenced. Speech recognition of an input speech is performed, a phonemic transcription is output, a collation unit conversion means divides the phonemic transcription into the same units as division units of a text retrieval dictionary divided into units smaller than the language models. A text retrieval means uses the division result to retrieve the text retrieval dictionary (para. [0008]).

In Patent Literature 2, words in the speech recognition vocabulary are converted to word strings by the large vocabulary continuous speech recognition. Phoneme and syllable recognition is used for words not in the speech recognition vocabulary and recognition error words to recognize phoneme strings and syllable strings that are units shorter than words, thereby enabling to provide a speech retrieval apparatus and method based on speech and text input from a large amount of speech data, including unknown words not in the dictionary or including recognition errors (para. [0027]).

In Patent Literature 3, candidate segments are narrowed down in advance based on a sub-word string generated from a keyword. A candidate segment, serving as a retrieval result, is selected by ranking the candidate segments by a simple process of incrementing a count value of the candidate segment, including the sub-word, thereby enabling to perform high-speed retrieval of speech data and accurate retrieval of speech data by generating a candidate segment after correction of erroneous recognition in speech recognition for the sub-word string generated from the keyword (para. [0015]).

In Non-patent Literature 1, individual syllables are used as sub-word units in the continuous conversation recognition. N-gram arrays of syllables are used as retrieval units to solve a problem of out-of-vocabulary (OOV) keywords and recognition error words in conversational words.
Patent Literature 1 JP2008-262279A
Patent Literature 2 JP2011-175046A Patent Literature 3 JP2009-128508A
Non-patent Literature 1 Keisuke Iwami et al, "Out-of-vocabulary term detection by n-gram array with distance from continuous syllable recognition results", SLT 2010, pages 200-205, Dec. 15, 2010.
Non-patent Literature 2 Hagen Soltau et al, "The IBM Attila Speech Recognition Tool kit", Spoken Language Technology Workshop (SLT), 2010 IEEE, pages 97-102, Dec. 15, 2010, can be acquired from <URL:http://ieeexplore.ieee.org/xpl/login.jsp?tp=&arnumber=5700829&url=http%3A%2F%2Fieeexplore.ieee.org%2Fxpls%2Fabs_all.jsp%3Farnumber%3D5700829>

SUMMARY

There is a demand for putting more weight on recall of speech recognition or for putting more weight on precision according to the business operation.

The recall is a scale for determining how thoroughly the detection is performed, although over detection caused by a speech recognition error is permitted. The recall is calculated by a ratio of retrieval results satisfying the retrieval request to all retrieval results.

The precision is a scale for determining whether only accurately recognized results are detected. The precision is calculated by a ratio of retrieval results satisfying the retrieval request to all documents satisfying the retrieval request.

Basically, the precision and the recall are in a trade-off relationship. Therefore, when one of the precision and the recall is increased, the other tends to decrease.

In general, character string retrieval can be performed for results of "word speech recognition with words as recognition units" (hereinafter, also called "word speech recognition") to perform highly accurate keyword retrieval. However, it is difficult to control both of the recall and the precision. For example, although operation, such as changing the probability of appearance of words, can be performed to execute the speech recognition again to thereby adjust the recall or the precision in some degree, this method is not practical. A large amount of speeches (e.g., several to several tens of thousands of hours) are generated every day at a call center, and the speeches need to be checked. In proportion to the amount of speech data, it takes much more time to execute the speech recognition of the large number of speeches. Preparing different speech recognition results for each speaker for the large number of speeches is not realistic in terms of cost and time.

On the other hand, the method of performing matching for results of "phoneme speech recognition with phonemes or syllables, which are units shorter than words, as recognition units" (hereinafter, also called "phoneme speech recognition") cannot increase high speech recognition accuracy because the use of language information is insufficient. More specifically, while the phoneme speech recognition can be executed faster than the word speech recognition, the speech recognition rate is not high.

Therefore, an object of the present invention is to provide a high-quality retrieval engine, and particularly, to provide a speech retrieval technique with a higher precision.

Another object of the present invention is to enable outputting only a segment with a high precision or outputting segments with higher to lower precision to enable speech retrieval at a desired target precision.

Another object of the present invention is to perform retrieval by a keyword covering retrieval performance with a high precision, without executing the speech recognition again, because the speech recognition of a large amount of speech data takes much more time.

The present invention provides a method and apparatus for speech retrieval. Particularly, the present invention provides a method and apparatus for specifying a segment with a designated keyword (which is also an index term) from speech data. The present invention includes a speech retrieval method, a speech retrieval apparatus, a program for the speech retrieval apparatus, and a program product for the speech retrieval apparatus.

A first aspect according to the present invention provides a speech retrieval method, comprising causing a speech retrieval apparatus to execute the steps of:

acquiring a keyword designated by a character string, and a phoneme string or a syllable string;

detecting one or more coinciding segments by comparing a character string that is a recognition result of word speech recognition with words as recognition units performed for speech data to be retrieved and the character string of the keyword;

calculating an evaluation value of each of the one or more segments by using the phoneme string or the syllable string of the keyword to evaluate a phoneme string or a syllable string that is recognized in each of the detected one or more segments and that is a recognition result of phoneme speech recognition with phonemes or syllables as recognition units performed for the speech data; and outputting a segment in which the calculated evaluation value exceeds a predetermined threshold.

In one embodiment of the present invention, the step of calculating may include a step of comparing a phoneme string or a syllable string that is an N-best recognition result of phoneme speech recognition with phonemes or syllables as recognition units performed for speech data associated with each of the detected one or more segments and the phoneme string of the keyword to set a rank of the coinciding N-best recognition result as an evaluation value.

In one embodiment of the present invention, the step of calculating may include a step of setting, as an evaluation value, an edit distance between a phoneme string or a syllable string that is a 1-best recognition result of phoneme speech recognition with phonemes or syllables as recognition units performed for speech data associated with each of the detected one or more segments and the phoneme string or the syllable string of the keyword.

In one embodiment of the present invention, the edit distance may be a distance matched by matching based on dynamic programming.

In one embodiment of the present invention, the phoneme string or the syllable string associated with each of the segments may be a phoneme string or a syllable string associated with a segment in which a start and an end of the segment is expanded by a predetermined time.

In one embodiment of the present invention, the method may include causing the speech retrieval apparatus to further execute a step of performing word speech recognition of the speech data to be retrieved, with words as recognition units.

In one embodiment of the present invention, the method may include causing the speech retrieval apparatus to further execute a step of performing phoneme speech recognition of the speech data associated with each of the detected one or more segments, with phonemes or syllables as recognition units.

In one embodiment of the present invention, the method may include causing the speech retrieval apparatus to further execute a step of performing phoneme speech recognition of the speech data to be retrieved, with phonemes or syllables as recognition units.

The first aspect according to the present invention includes causing the speech retrieval apparatus to execute the steps of:

performing word speech recognition of the speech data to be retrieved, with words as recognition units;

acquiring a keyword designated by a character string, and a phoneme string or a syllable string;

detecting one or more coinciding segments by comparing a character string that is a recognition result of the word speech recognition and the character string of the keyword;

performing phoneme speech recognition of speech data associated with the detected one or more segments, with phonemes or syllables as recognition units;

calculating an evaluation value of each of the one or more segments by using the phoneme string or the syllable string of the keyword to evaluate a phoneme string or a syllable string recognized in each of the detected one or more segments; and outputting a segment in which the calculated evaluation value exceeds a predetermined threshold.

The first aspect according to the present invention includes causing the speech retrieval apparatus to execute the steps of:

acquiring a character string that is a recognition result by performing word speech recognition of the speech data to be retrieved, with words as recognition units, and acquiring a phoneme string or a syllable string that is a recognition result by performing phoneme speech recognition of the speech data to be retrieved, with phonemes or syllables as recognition units;

acquiring a keyword designated by a character string, and a phoneme string or a syllable string;

detecting one or more coinciding segments by comparing a character string that is a recognition result of the word speech recognition and the character string of the keyword;

calculating an evaluation value of each of the one or more segments by using the phoneme string or the syllable string of the keyword to evaluate a phoneme string or a syllable string recognized in each of the detected one or more segments; and outputting a segment in which the calculated evaluation value exceeds a predetermined threshold.

A second aspect according to the present invention provides a speech retrieval apparatus including:

a keyword acquisition unit configured to acquire a keyword designated by a character string, and a phoneme string or a syllable string;

a segment detection unit configured to detect one or more coinciding segments by comparing a character string that is a recognition result of word speech recognition with words as recognition units performed for speech data to be retrieved and the character string of the keyword;

an evaluation value calculation unit configured to calculate an evaluation value of each of the one or more segments by using the phoneme string or the syllable string of the keyword to evaluate a phoneme string or a syllable string that is recognized in each of the detected one or more segments and that is a recognition result of phoneme speech recognition with phonemes or syllables as recognition units performed for the speech data; and a segment output unit configured to output a segment in which the calculated evaluation value exceeds a predetermined threshold.

In one embodiment of the present invention, the evaluation value calculation unit may compare a phoneme string or a syllable string that is an N-best recognition result of phoneme speech recognition with phonemes or syllables as recognition units performed for speech data associated with each of the detected one or more segments and the phoneme string of the keyword to set a rank of the coinciding N-best recognition result as an evaluation value.

In one embodiment of the present invention, the evaluation value calculation unit may set, as an evaluation value, an edit distance between a phoneme string or a syllable string that is a 1-best recognition result of phoneme speech recognition, with phonemes or syllables as recognition units performed for speech data associated with each of the detected one or more segments and the phoneme string or the syllable string of the keyword.

In one embodiment of the present invention, the edit distance may be a distance matched by matching based on dynamic programming.

In one embodiment of the present invention, the phoneme string or the syllable string associated with each of the segments may be a phoneme string or a syllable string associated with a segment in which a start and an end of the segment is expanded by a predetermined time.

In one embodiment of the present invention, the speech retrieval apparatus may further include a word speech recognition unit configured to perform word speech recognition of the speech data to be retrieved, with words as recognition units.

In one embodiment of the present invention, the speech retrieval apparatus may further include a phoneme speech recognition unit configured to perform phoneme speech recognition of the speech data associated with each of the detected one or more segments, with phonemes or syllables as recognition units.

In one embodiment of the present invention, the speech retrieval apparatus may further include a phoneme speech recognition unit configured to perform phoneme speech recognition of the speech data to be retrieved, with phonemes or syllables as recognition units.

A third aspect according to the present invention provides a program (e.g., computer program) for a speech retrieval apparatus and a program product (e.g., computer program product) for the speech retrieval apparatus, the program and the program product causing the speech retrieval apparatus (e.g., computer) to execute the steps of the speech retrieval method according to the first aspect of the present invention.

The programs for the speech retrieval apparatus, according to one embodiment of the present invention, can be stored in one or a plurality of arbitrary recording media readable by the speech retrieval apparatus, such as a flexible disk, an MO, a CD-ROM, a DVD, a BD, a hard disk apparatus, a memory medium connectable to USB, a ROM, an MRAM, and a RAM. The programs for the speech retrieval apparatus can be downloaded from another data processing system, such as a computer, connected by a communication line to store the programs in a recording medium or can be copied from another recording medium. The programs for the speech retrieval apparatus, according to one embodiment of the present invention, can also be compressed and divided into a plurality of programs to store the programs in one or a plurality of recording media. It should be noted that the program product for the speech retrieval apparatus according to the embodiment of the present invention can be provided in various formats. The program product for the speech retrieval apparatus, according to one embodiment of the present invention, can include, for example, a storage medium recording the program for the speech retrieval apparatus or a transmission medium for transmitting the program for the speech retrieval apparatus.

It should be noted that the summary of the present invention does not cite all necessary features of the present invention, and a combination or a subcombination of the constituent elements can also be the present invention.

Those skilled in the art can easily suppose various changes, such as combining the hardware constituent elements of the speech retrieval apparatus used in one embodiment of the present invention with a plurality of machines and distributing functions to the machines to carry out the functions. The changes are concepts included in the concept of the present invention. However, the constituent elements are exemplary, and not all constituent elements are essential constituent elements of the present invention.

The present invention can be realized by hardware, software, or a combination of hardware and software. A typical example of the execution by the combination of hardware and software includes execution of a program in the speech retrieval apparatus provided with the program for the speech retrieval apparatus. In this case, the program for the speech retrieval apparatus is loaded on a memory of the speech retrieval apparatus and executed, and the program for the speech retrieval apparatus controls the speech retrieval apparatus to execute processes according to the present invention. The program for the speech retrieval apparatus can include instructions that can be expressed by an arbitrary language, code, or transcription. The instructions enable the speech retrieval apparatus to directly execute a specific function or to execute a specific function after one or both of 1. conversion to another language, code, or transcription and 2. copy to another medium.

According to the embodiment of the present invention, a speech retrieval engine with a higher precision can be provided.

According to the embodiment of the present invention, a threshold T described below can be adjusted to output only a segment with a high precision or to output segments with higher to lower precisions.

BRIEF DESCRIPTION OF THE DRAWINGS

FIG. 2A shows a diagram for generating, from speech data (English), a word string, and a phoneme string or a syllable string (hereinafter, simple "phoneme string" denotes "phoneme string or syllable string") that can be used in the embodiment of the present invention;

FIG. 2C shows a diagram for performing keyword detection from the recognition result of the word speech recognition and from a 1-best recognition result of the phoneme speech recognition performed in FIG. 2A according to the embodiment of the present invention;

DESCRIPTION OF THE EMBODIMENTS

Figure 1A:
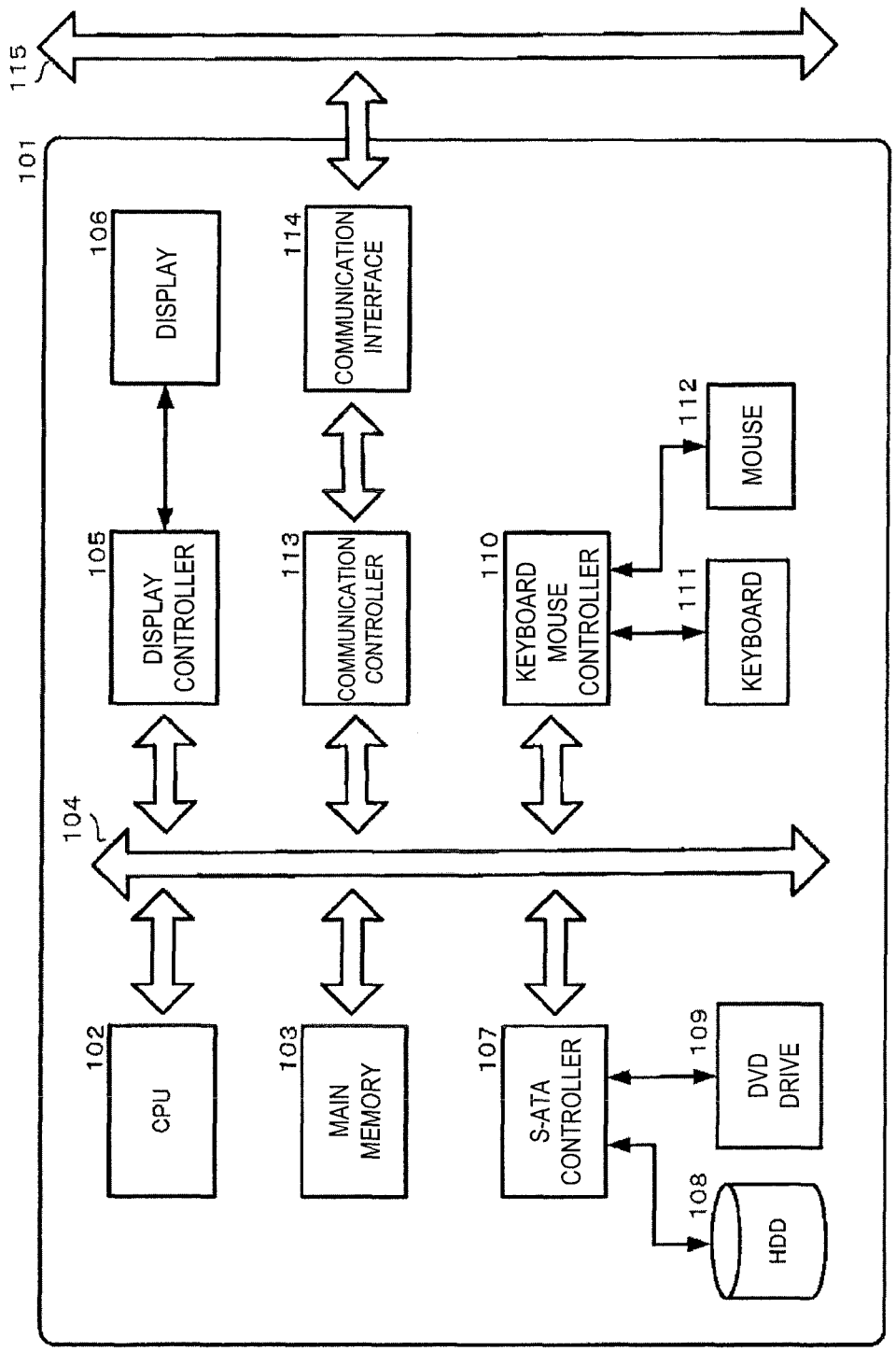
FIG. 1A is a diagram showing an example of a speech retrieval apparatus (e.g., computer) that can be used in an embodiment of the present invention.

An embodiment of the present invention will be described below according to the drawings. Throughout the following drawings, the same reference numerals indicate the same subjects unless otherwise specifically stated. The embodiment of the present invention is for describing a preferred mode of the present invention, and it should be understood that there is no intention to limit the scope of the present invention to the scope illustrated herein.

Figure 1B:
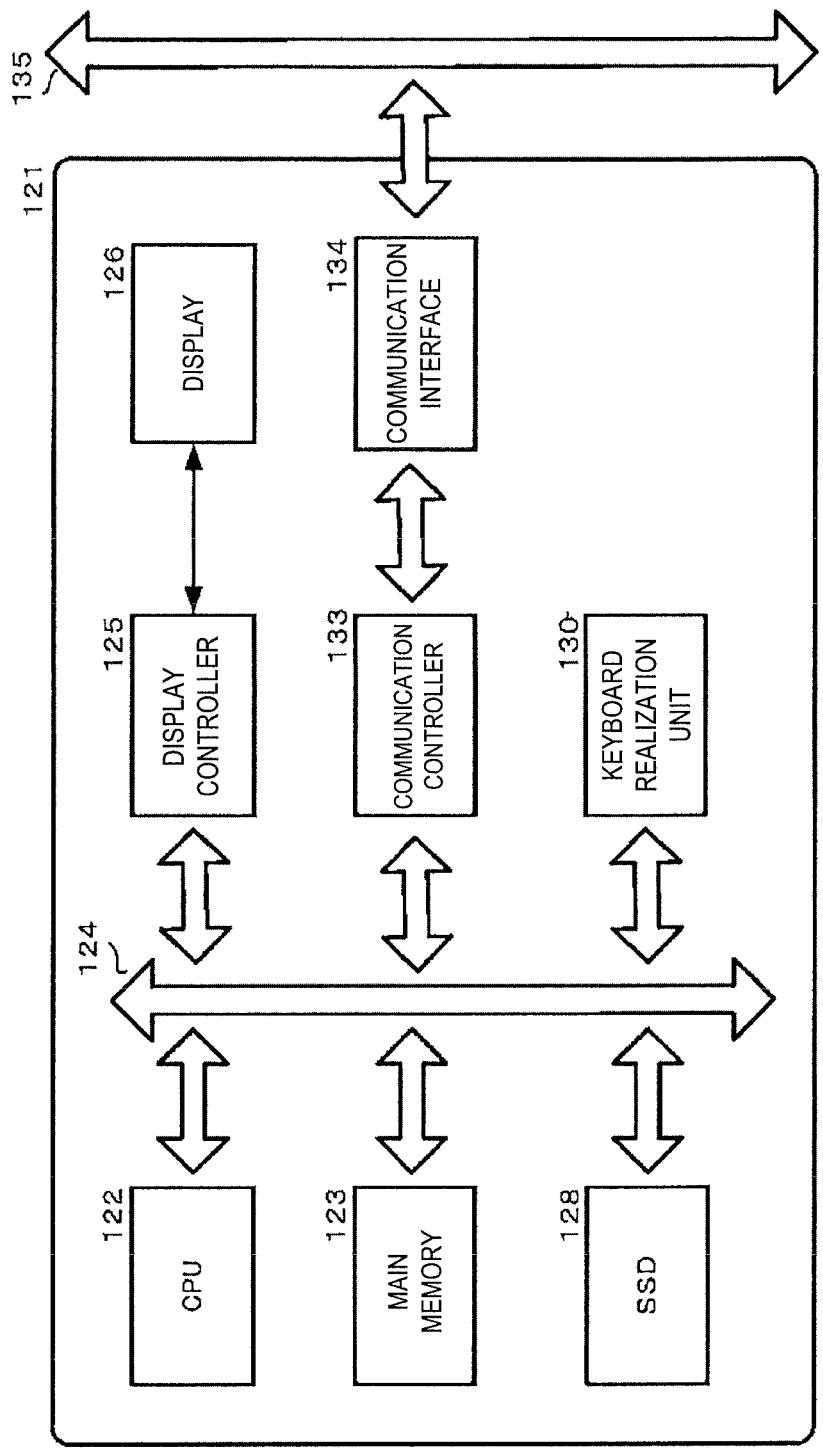
FIG. 1B is a diagram showing an example of a speech retrieval apparatus (e.g., smartphone, mobile phone, tablet terminal, or game terminal) that can be used in the embodiment of the present invention.

FIG. 1A and FIG. 1B are diagrams showing an example of hardware (e.g., speech retrieval apparatus) that can be used in the embodiment of the present invention.

The speech retrieval apparatus according to the embodiment of the present invention can include one or a plurality of speech retrieval apparatuses.

FIG. 1A is a diagram showing an example of a hardware configuration for realizing a speech retrieval apparatus (e.g., computer) that can be used in the embodiment of the present invention.

A speech retrieval apparatus (101) can be, for example, a computer (e.g., desktop computer, note computer, ultrabook, or server computer).

The speech retrieval apparatus (101) includes a CPU (102) and a main memory (103) that are connected to a bus (104). Preferably, the CPU (102) is based on 32-bit or 64-bit architecture. The CPU (102) can be, for example, Core™ i series, Core™ 2 series, Atom™ series, Xeon® series, Pentium® series, or Celeron® series of Intel Corporation, A series, Phenom™ series, Athlon™ series, Turion™ series, or Sempron™ of AMD (Advanced Micro Devices), Inc., or Power™ series of International Business Machines Corporation.

A display (106), such as a liquid crystal display (LCD), can be connected to the bus (104) through a display controller (105). The liquid crystal display (LCD) may be, for example, a touch panel display or a floating touch display. The display (106) can be used to display information, such as a speech retrieval result, displayed by activation of software, such as a program for a speech retrieval apparatus according to the embodiment of the present invention, operating on the speech retrieval apparatus (101), on an appropriate graphic interface.

A storage device (108), such as a hard disk and a solid-state drive, can be arbitrarily connected to the bus (104) through, for example, a SATA or IDE controller (107).

The storage device (108) and a drive (109), such as a CD, DVD, or BD drive, can be arbitrarily connected to the bus (104) through, for example, the SATA or IDE controller (107).

A keyboard (111) and a mouse (112) can be arbitrarily connected to the bus (104) through a peripheral device controller (110), such as through a keyboard mouse controller or a USB bus.

Java® processing environments, such as an operation system, Windows® OS, UNIX®, MacOS®, and J2EE, Java® application, Java® virtual machine (VM), program providing Java® just-in-time (JIT) compiler, program for speech retrieval apparatus according to the embodiment of the present invention, and other programs and data (e.g., speech data to be retrieved and a keyword designated by a character string, and a phoneme string or a syllable string) can be stored in the storage device (108) and can be loaded on the main memory (103).

The storage device (108) may be included in the speech retrieval apparatus (101), may be connected through a cable to allow access by the speech retrieval apparatus (101), or may be connected through a wired or wireless network to allow access by the speech retrieval apparatus (101).

The drive (109) can be used to install a program, such as an operating system and an application, from a CD-ROM, DVD-ROM, or BD on the storage device (108) as necessary.

A communication interface (114) is compliant with, for example, an Ethernet® protocol. The communication interface (114) is connected to the bus (104) through a communication controller (113) to play a role of wired or wireless connection of the speech retrieval apparatus (101) to a communication line (115) and to provide a network interface layer to a TCP/IP communication protocol of a communication function of the operation system of the speech retrieval apparatus (101). The communication line (115) can be, for example, a wired LAN environment based on a wired LAN connection standard, a wireless LAN environment based on a wireless LAN connection standard, a Wi-Fi wireless LAN environment, such as IEEE 802.11a/b/g/n, or a mobile phone network environment (e.g., 3G or 4G (including LTE) environment).

The speech retrieval apparatus (101) can receive data from, for example, another apparatus (e.g., computer or network attached storage) through the communication line (115) and store the data on the storage device (108).

FIG. 1B is a diagram showing an example of a speech retrieval apparatus (e.g., smartphone, mobile phone, tablet terminal, or game terminal) that can be used in the embodiment of the present invention.

A CPU (122), a main memory (123), a bus (124), a display controller (125), a display (126), an SSD (128), a communication controller (133), a communication interface (134), and a communication line (135) of a speech retrieval apparatus (121) shown in FIG. 1B correspond to the CPU (102), the main memory (103), the bus (104), the display controller (105), the display (106), the SSD (108), the communication controller (113), the communication interface (114), and the communication line (115) of the speech retrieval apparatus (101) shown in FIG. 1A, respectively.

When the speech retrieval apparatus (121) is a smartphone, a mobile phone, a tablet terminal, or the like, the CPU (122) can be, for example, various CPUs for smartphones, mobile phones, or tablet terminals or can be A series of Apple Inc.®.

The SSD (128) disk can store, for example, an OS for smartphones (e.g., Android® OS, Windows® PhoneOS, Windows®, or iOS), an application program according to the embodiment of the present invention, and other programs and data, which can be loaded on the main memory (123).

A keyboard realization unit (130) can display a software keyboard as an application on the display (126).

Figure 2B:
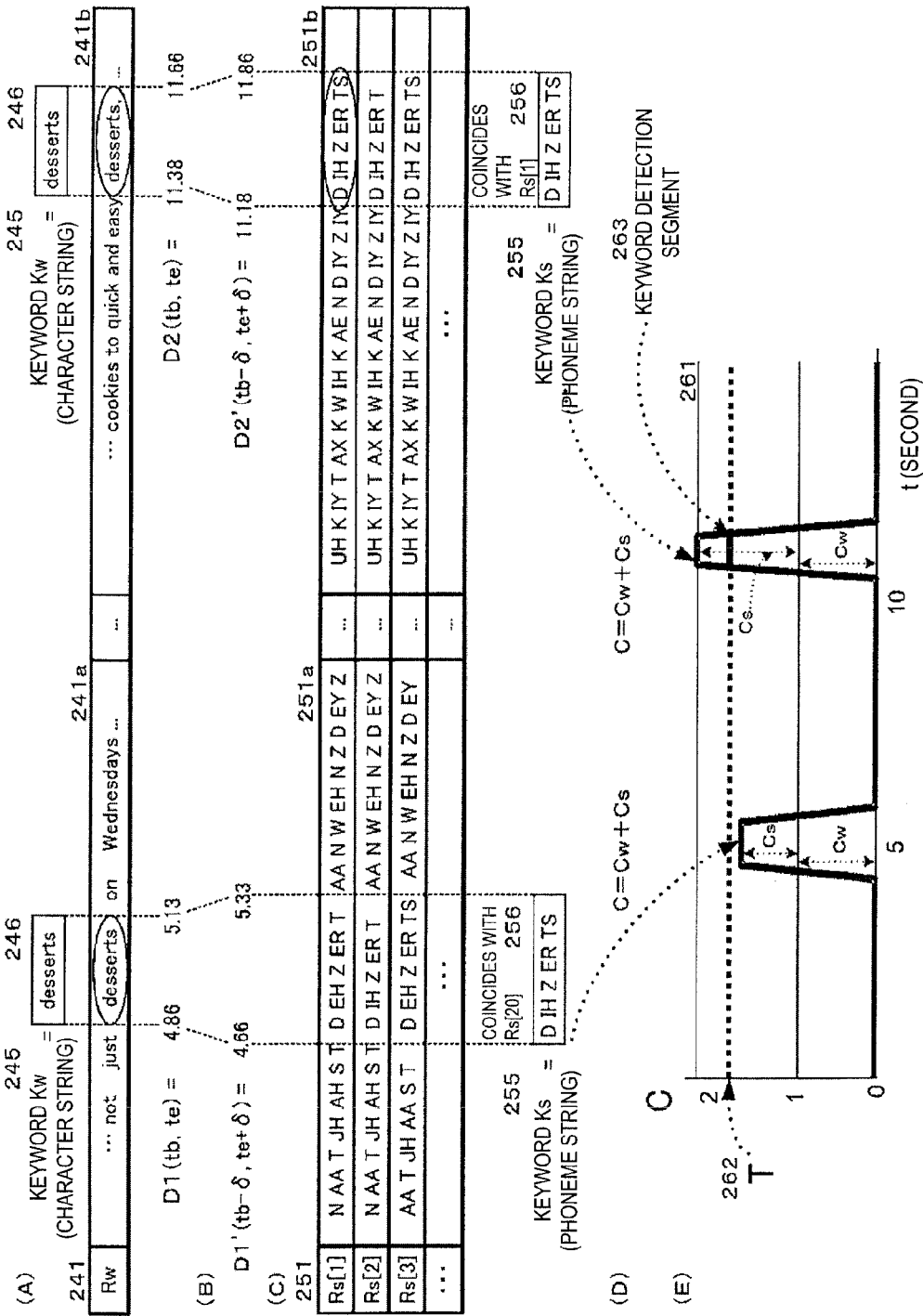
FIG. 2B shows a diagram for performing keyword detection from a recognition result of the word speech recognition and from N-best recognition results of phoneme speech recognition performed in FIG. 2A according to the embodiment of the present invention.

FIGS. 2A to 2C show diagrams for generating word strings and phoneme strings or syllable strings that can be used in the embodiment of the present invention from speech data and diagrams for performing keyword retrieval from the speech data according to the embodiment of the present invention.

FIGS. 2A to 2C show diagrams when the speech data is in English.

FIG. 2A shows a diagram for generating a word string, and a phoneme string or a syllable string that can be used in the embodiment of the present invention from the English speech data.

The speech retrieval apparatus (101) shown in FIG. 1A, the speech retrieval apparatus (121) shown in FIG. 1B, or an apparatus that provides data of a word string, and a phoneme string or a syllable string to the speech retrieval apparatus (hereinafter, the speech retrieval apparatus in the description of FIG. 2A denotes one of the speech retrieval apparatuses (101, 121) and the apparatus that provides the data) includes a word speech recognition unit (201) and a phoneme speech recognition unit (202).

The word speech recognition unit (201) performs word speech recognition of English speech data (211) to be retrieved, with words as recognition units, and acquires a recognition result Rw of the word speech recognition.

The word speech recognition result Rw is a word string. The word string can be, for example, a word string with a time index. The word string with a time index can be in a repetitive format (222) of {word w, start time b, end time e}, for instance.

The word speech recognition unit (201) can store the character string (word string) that is the recognition result Rw of the word speech recognition in, for example, a storage medium (221) storing word strings that is accessible by the speech retrieval apparatus.

It is assumed that the word speech recognition unit (201) has output a word string partially including the following word string as the recognition result Rw of the word speech recognition for the speech data (211) (223) (time index is not displayed).

Rw= . . . not just desserts on Wednesdays . . . cookies to quick and easy desserts, . . .

The phoneme speech recognition unit (202) performs phoneme speech recognition of the English speech data (211) to be retrieved, with phonemes or syllables as recognition units, and acquires recognition results Rs of the phoneme speech recognition. The phonemes or the syllables are also called sub-words, and the phonemes or the syllables are units shorter than words.

The phoneme speech recognition results Rs are phoneme strings or syllable strings. The phoneme strings or the syllable strings can be, for example, phoneme strings or syllable strings with time indices. The phoneme strings or the syllable strings with time indices can be in a repetitive format (232) of {phoneme string or syllable string w, start time b, end time e}, for example.

The phoneme speech recognition unit (202) can store the phoneme strings or the syllable strings that are the recognition results Rs of the phoneme speech recognition in, for example, a storage medium (231) storing phoneme strings that are accessible by the speech retrieval apparatus.

The phoneme speech recognition unit (202) can output recognition results of N-best or a recognition result of 1-best as the recognition results of the phoneme speech recognition. The recognition results of N-best can be indicated by, for example, Rs=Rs[1], Rs[2], Rs[3], . . . , Rs[N] (hereinafter, also written as Rs[1 . . . N]) (time index is not displayed) (233). The recognition result of 1-best can be indicated by, for example, Rs=Rs[1] (time index is not displayed) (234).

It is assumed that the phoneme speech recognition unit (202) has output the following phoneme strings or syllable strings as the N-best recognition results Rs of the phoneme speech recognition for the speech data (211) (233) (time index is not displayed).

Rs[1]= . . . N AA T JH AH S T D EH Z ER T AA N W EH N Z D EY Z . . . UH K IY T AX K W IH K AE N D IY Z IY D IH Z ER TS . . .

Rs[2]= . . . N AA T JH AH S T D IH Z ER T AA N W EH N Z D EY Z . . . UH K IY T AX K W IH K AE N D IY Z IY D IH Z ER T . . .

Rs[3]= . . . AA T JH AA S T D EH Z ER TS AA N W EH N Z D EY . . . UH K IY T AX K W IH K AE N D IY Z IY D IH Z ER TS . . .

. . .

Rs[N]= . . .

Or it is assumed that the phoneme speech recognition unit (202) has output the following phoneme string or syllable string as the 1-best recognition result Rs of the phoneme speech recognition for the speech data (211) (234) (time index is not displayed).

Rs= . . . N AA T JH AH S T D EH Z ER T AA N W EH N Z D EY Z . . . UH K IY T AX K W IH K AE N D IY Z IY D IH Z ER TS . . .

FIG. 2B shows a diagram for performing keyword detection from the recognition result Rw of the word speech recognition and the N-best recognition results Rs of the phoneme speech recognition performed in FIG. 2A according to the embodiment of the present invention. Hereinafter, the speech retrieval apparatus denotes the speech retrieval apparatus (101) shown in FIG. 1A or the speech retrieval apparatus (121) shown in FIG. 1B in the description of FIG. 2B.

The speech retrieval apparatus (101, 121) acquires a keyword to be retrieved (hereinafter, also called "retrieval keyword") for performing keyword retrieval. For example, it is assumed that a character string Kw (245) of the keyword is "desserts" (246) and that a phoneme string Ks (255) of the keyword is "D IH Z ER TS" (256).

In FIG. 2B(A), the speech retrieval apparatus (101, 121) compares the character string Kw of the retrieval keyword (245) "desserts" (246) and a character string in a word speech recognition result Rw (241). More specifically, the speech retrieval apparatus (101, 121) determines whether the character string Kw of the retrieval keyword coincides with at least part of the character string that is the word speech recognition result Rw.

Rw (241) shown in FIG. 2B(A) indicates parts (241a and 241b) including the character string Kw of the retrieval keyword (245) "desserts" (246).

In FIG. 2B(A), it is assumed that the speech retrieval apparatus (101, 121) has found that the character string Kw of the retrieval keyword (245) "desserts" (246) coincides with a character string "desserts" in a segment D1 (tb, te)=4.86 to 5.13 seconds in Rw (241) and a character string "desserts" in a segment D2 (tb, te)=11.38 to 11.66 seconds. In FIG. 2B(A), tb denotes a start time of the segment D in which the coinciding character string appears in the speech data, and te denotes an end time of the segment D in which the coinciding character string appears in the speech data.

The speech retrieval apparatus (101, 121) detects the segment D1 and the segment D2 (tb, te) as segments in which the character string Kw of the retrieval keyword coincides with part of the character string in the word speech recognition result Rw.

In FIG. 2B(B), the speech retrieval apparatus (101, 121) expands the start and end of both ends (e.g., start time and end time) of the segment D1 (tb, te)=4.86 to 5.13 seconds and the segment D2 (tb, te)=11.38 to 11.66 seconds by a predetermined time (e.g., 0.2 seconds) to set a segment D1' (tb−δ, te+δ)=4.66 to 5.33 seconds and a segment D2' (tb−δ, te+δ)=11.18 to 11.86 seconds.

Rs (251) shown in FIG. 2B(C) indicates parts (251a and 251b) including the phoneme string Ks (256) of the retrieval keyword.

In FIG. 2B(C), the speech retrieval apparatus (101, 121) acquires the N-best phoneme speech recognition results Rs recognized in the segment D1' and in the segment D2'. The phoneme speech recognition results Rs can be obtained by extracting phoneme speech recognition results associated with the segment D1' and the segment D2' among the results of the phoneme speech recognition performed for the speech data to be retrieved (211) or can be phoneme speech recognition results obtained by directly performing the phoneme speech recognition for the speech data associated with the segment D1' and the segment D2'.

The N-best phoneme speech recognition results Rs are indicated by Rs=Rs[1], Rs[2], Rs[3], . . . , Rs[N] (251), and the rank decreases with an increase in the value of N.

It is assumed that the speech retrieval apparatus (101, 121) has found that there is a phoneme string coinciding with the phoneme string Ks (255) of the retrieval keyword "D IH Z ER TS" (256) in a phoneme speech recognition result Rs[20] in the segment D1' (251). Similarly, it is assumed that the speech retrieval apparatus (101, 121) has found that there is a phoneme string coinciding with the phoneme string Ks of the retrieval keyword (255) "D IH Z ER TS" (256) in the phoneme speech recognition result Rs[1] in the segment D2' (252).

In FIG. 2B(D), the speech retrieval apparatus (101, 121) calculates scores Cs as indices indicating likelihoods of the segment D1' and the segment D2' according to the following formula:

$$Cs=1-\log 10(n)/\log 10(N)$$

The speech retrieval apparatus (101, 121) calculates Cs(D1')=0.56 for the segment D1' and Cs(D2')=1 for the segment D2'.

The speech retrieval apparatus (101, 121) further calculates scores C that are evaluation values of the segment D1' and the segment D2' according to the following formula:

$$C=Cw+Cs$$

Here, Cw is 1 when the character string Kw of the retrieval keyword (245) "desserts" (246) coincides with a character string in a segment in Rw (241) and is 0 if they do not coincide. Cs is an index indicating the likelihood of the segment in which the character string Kw (245) "desserts" (246) coincides, as described above.

The speech retrieval apparatus (101, 121) calculates C(D1')=1(Cw)+0.56(Cs)=1.56 for the segment D1' and C(D2')=1(Cw)+1(Cs)=2 for the segment D2'.

In FIG. 2B(E), as indicated by a graph (261), the speech retrieval apparatus (101, 121) compares C(D1') and C(D2') with a threshold T 1.7 (262) and outputs the segment D2' exceeding the threshold as a keyword detection segment (263).

FIG. 2C shows a diagram for performing keyword detection from the recognition result Rw of the word speech recognition and the 1-best recognition result Rs of the phoneme speech recognition performed in FIG. 2A according to the embodiment of the present invention. Hereinafter, the speech retrieval apparatus denotes the speech retrieval apparatus (101) shown in FIG. 1A or the speech retrieval apparatus (121) shown in FIG. 1B in the description of FIG. 2C.

The speech retrieval apparatus (101, 121) acquires a retrieval keyword for performing keyword retrieval. It is assumed that the character string Kw (245) of the keyword is "desserts" (246) and that the phoneme string Ks (255) of the keyword is "D IH Z ER TS" (256).

In FIG. 2C(A), the speech retrieval apparatus (101, 121) compares the character string Kw of the retrieval keyword (245) "desserts" (246) and the character string in the word speech recognition result Rw. More specifically, the speech retrieval apparatus (101, 121) determines whether the character string Kw of the retrieval keyword coincides with at least part of the character string that is the word speech recognition result Rw.

Rw (241) shown in FIG. 2C(A) indicates the parts (241a and 241b) including the character string Kw of the retrieval keyword (245) "desserts" (246).

In FIG. 2C(A), for example, it is assumed that the speech retrieval apparatus (101, 121) has found that the character string Kw of the retrieval keyword (245) "desserts" (246) coincides with the character string "desserts" in the segment D1 (tb, te)=4.86 to 5.13 seconds in Rw (241) and the character string "desserts" in the segment D2 (tb, te)=11.38 to 11.66 seconds.

The speech retrieval apparatus (101, 121) detects the segment D1 and the segment D2 (tb, te) as segments in which the character string Kw of the retrieval keyword (245) "desserts" (246) coincides with part of the character string that is the word speech recognition result Rw (241).

In FIG. 2C(B), the speech retrieval apparatus (101, 121) expands the start and end of both ends (e.g., start time and end time) of the segment D1 (tb, te)=4.86 to 5.13 seconds and the segment D2 (tb, te)=11.38 to 11.66 seconds by a predetermined time (e.g., 0.2 seconds) to set the segment D1' (tb−δ, te+δ)=4.66 to 5.33 seconds and the segment D2' (tb−δ, te+δ)=11.18 to 11.86 seconds.

Rs (271) shown in FIG. 2C(C) indicates parts (271a and 271b) including the phoneme string Ks (256) of the retrieval keyword.

In FIG. 2C(C), the speech retrieval apparatus (101, 121) acquires the 1-best phoneme speech recognition result Rs recognized in the segment D1' and in the segment D2'. The phoneme speech recognition result Rs can be obtained by extracting a phoneme speech recognition result associated with the segment D1' and the segment D2' among the results of the phoneme speech recognition performed for the speech data to be retrieved (211) or can be a phoneme speech recognition result obtained by directly performing the phoneme speech recognition for the speech data associated with the segment D1' and the segment D2'.

The 1-best phoneme speech recognition result Rs is a result when N in N-best is 1 (271).

For example, it is assumed that the speech retrieval apparatus (101, 121) has found that there is a phoneme string coinciding with the phoneme string Ks of the retrieval keyword (255) "D IH Z ER TS" (256) in the phoneme speech recognition result Rs in the segment D1' (271). Similarly, it is assumed that the speech retrieval apparatus (101, 121) has found that there is a phoneme string coinciding with the phoneme string Ks of the retrieval keyword (255) "D IH Z ER TS" (256) in the phoneme speech recognition result Rs in the segment D2' (272).

In FIG. 2C(D), the speech retrieval apparatus (101, 121) calculates the scores Cs as indices indicating likelihoods of the segment D1' and the segment D2' according to the following formula by using a character replacement cost chart (281) for edit distances from the phoneme strings "D EH Z ER T" (271a) and "D IH Z ER TS" (271b), which are recognition results of 1-best, to the phoneme string of the retrieval keyword (255) "D IH Z ER TS" (256):

$Cs=1-\text{edit distance}(Ks,Rs)/\text{length}(Ks)$

The speech retrieval apparatus (101, 121) calculates Cs(D1')=0.68 for the segment D1' (282) and Cs(D2')=1 for the segment D2' (283).

The speech retrieval apparatus (101, 121) further calculates the scores C as evaluation values of the segment D1' and the segment D2', according to the formula C=Cw+Cs shown in FIG. 2B(D).

The speech retrieval apparatus (101, 121) calculates C(D1')=1(Cw)+0.68(Cs)=1.68 for the segment D1' and C(D2')=1(Cw)+1(Cs)=2 for the segment D2'.

In FIG. 2C(E), as indicated by a graph (291), the speech retrieval apparatus (101, 121) compares C(D1') and C(D2') with a threshold T 1.7 (292) and outputs the segment D2' exceeding the threshold as a keyword detection segment (293).

Hereinafter, a process for generating a word string, and a phoneme string or a syllable string that can be used in the embodiment of the present invention from speech data will be described according to a flow chart shown in FIG. 4A. A process for performing keyword retrieval from the speech data according to the embodiment of the present invention will be described according to flow charts shown in FIG. 4B and FIG. 4C.

Figure 4A:
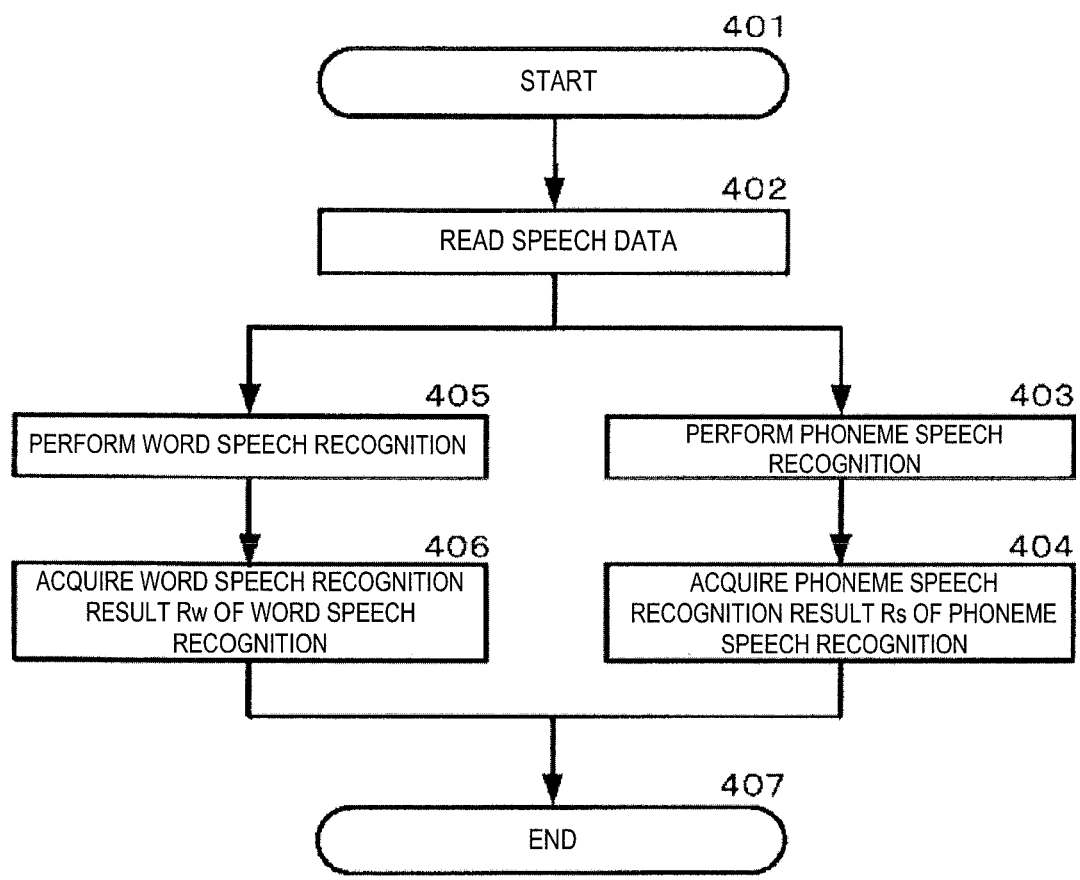
FIG. 4A shows a flow chart for generating, from speech data, a word string, and a phoneme string or a syllable string (hereinafter, simple "phoneme string" denotes "phoneme string or syllable string") that can be used in the embodiment of the present invention.

FIG. 4A shows a flow chart for generating a word string, and a phoneme string or a syllable string that can be used in the embodiment of the present invention from speech data.

The word string and the phoneme string or the syllable string that can be used in the embodiment of the present invention may be generated by the speech retrieval apparatus (101) shown in FIG. 1A or the speech retrieval apparatus (121) shown in FIG. 1B or may be generated by an electronic apparatus (e.g., computer) other than the speech retrieval apparatuses (101, 121).

A case that the speech retrieval apparatus (101) shown in FIG. 1A or the speech retrieval apparatus (121) shown in FIG. 1B generates the word string and the phoneme string or the syllable string that can be used in the embodiment of the present invention will be described below. In the description of the flow chart shown in FIG. 4A, "speech retrieval apparatus" denotes the speech retrieval apparatus (101) or the speech retrieval apparatus (121).

In step 401, the speech retrieval apparatus (101, 121) starts the process of generating a word string and arbitrarily generating a phoneme string or a syllable string from speech data.

In step 402, the speech retrieval apparatus (101, 121) reads speech data from, for example, a storage medium (e.g., the storage medium (108) shown in FIG. 1A or the storage medium (128) shown in FIG. 1B) readable by the computer or downloads speech data from another apparatus (e.g., computer or network attached storage) accessible by the computer through a network.

In step 403, the speech retrieval apparatus (101, 121) performs phoneme speech recognition of the speech data read in step 402 according to a phoneme speech recognition method as a conventional technique. In the phoneme speech recognition, the speech data is converted to a symbol string of phonemes or syllables that are basic units of spoken language. The phoneme speech recognition is executed as, for example, part of the speech recognition engine and is performed by extracting a characteristic index used to identify a phoneme from a speech signal of speech data and using an acoustic model (e.g., database recording correspondence between features of speech signals and phonemes) to convert the speech data to a list of phonemes or syllables.

The phoneme is a minimum unit of speech for distinguishing meaning of a word. The syllable typically is a group based on a vowel, such as (1) vowel (V), (2) consonant+vowel (CV), (3) vowel+consonant (VC), and (4) consonant+vowel+consonant (CVC). Although the definition of the phonemes and the syllables may vary from language to language, the phonemes or the syllables in the embodiment of the present invention include definitions that vary from language to language.

In step 404, the speech retrieval apparatus (101, 121) acquires the recognition result Rs of the phoneme speech recognition in step 403. The phoneme speech recognition result Rs is a phoneme string or a syllable string. The phoneme string or the syllable string can be, for example, a phoneme string or a syllable string with a time index. The phoneme string or the syllable string with a time index can be, for example, in a repetitive format of {phoneme string or syllable string w start time b, end time e}.

The speech retrieval apparatus (101, 121) can output a recognition result of N-best or a recognition result of 1-best as a recognition result of the phoneme speech recognition.

The speech retrieval apparatus (101, 121) can write the acquired phoneme speech recognition result Rs in, for example, a storage medium (e.g., the storage medium (108) shown in FIG. 1A or the storage medium (128) shown in FIG. 1B) writable by the speech retrieval apparatus (101, 121) or can upload the acquired phoneme speech recognition result Rs to another apparatus (e.g., computer or network attached storage) accessible by the speech retrieval apparatus (101, 121) through a network.

The speech retrieval apparatus (101, 121) may execute the process of generating the phoneme string or the syllable string only from speech data associated with a segment D (tb, te) of step 416 shown in FIG. 4B described below (e.g., speech data within start time and end time of the segment D) after the segment D is detected, instead of carrying out step 403 and step 404. Alternatively, the speech retrieval apparatus (101, 121) may execute the process of generating the phoneme string or the syllable string only from speech data associated with a segment D' (tb−δ, te+δ) of step 417 shown in FIG. 4B described below (e.g., speech data within start time and end time of the segment D') after the segment D' is detected, instead of carrying out step 403 and step 404.

In step 405, the speech retrieval apparatus (101, 121) performs word speech recognition of the speech data read in step 402 according to a word speech recognition method as a conventional technique, independent of step 403. Alternatively, the speech retrieval apparatus (101, 121) performs word speech recognition of the phoneme speech recognition result Rs acquired in step 404 according to the word speech recognition method as a conventional technique. In the word speech recognition, speech data is converted to a word string. The word speech recognition is executed as, for example, part of a speech recognition engine, wherein, for example, a recognition dictionary (e.g., database recording correspondence between combinations of phonemes and words) is used to replace the phoneme string with words, and a language model (e.g., database recording validity of combinations of words) is further used to select a most valid word candidate. Examples of the conventional technique of word speech recognition include, but are not limited to, a continuous speech recognition system and a large vocabulary continuous speech recognition system. The large vocabulary continuous speech recognition system can be, for example, a technique according to Non-patent Literature 2 "The IBM Attila Speech Recognition Toolkit".

In step 406, the speech retrieval apparatus (101, 121) acquires the recognition result Rw of the word speech recognition of step 405. The word speech recognition result Rw is a word string. The word string can be, for example, a word string with a time index. The word string with a time index can be in a repetitive format of, for example, {word w, start time b, end time e}.

The speech retrieval apparatus (101, 121) can output a recognition result of N-best or a recognition result of 1-best as the recognition result of the word speech recognition.

The speech retrieval apparatus (101, 121) can write the acquired word speech recognition result Rw in, for example, a storage medium (e.g., the storage medium (108) shown in FIG. 1A or the storage medium (128) shown in FIG. 1B) writable by the speech retrieval apparatus (101, 121) or can upload the acquired word speech recognition result Rw to another apparatus (e.g., computer or network attached storage) accessible by the speech retrieval apparatus (101, 121) through a network.

In step 407, the speech retrieval apparatus (101, 121) ends the process of generating the word string and the phoneme string or the syllable string from the speech data. When the speech retrieval apparatus (101, 121) continuously performs keyword retrieval from the speech data, the speech retrieval apparatus (101, 121) advances the process to a process shown in the flow chart of FIG. 4B.

For the description of a case in which an electronic apparatus (e.g., computer) other than the speech retrieval apparatuses (101, 121) generates the word string and the phoneme string or the syllable string that can be used in the embodiment of the present invention, the speech retrieval apparatus (101, 121) as an entity of the process of steps 401 to 407 shall be read as the electronic apparatus.

Figure 4B:
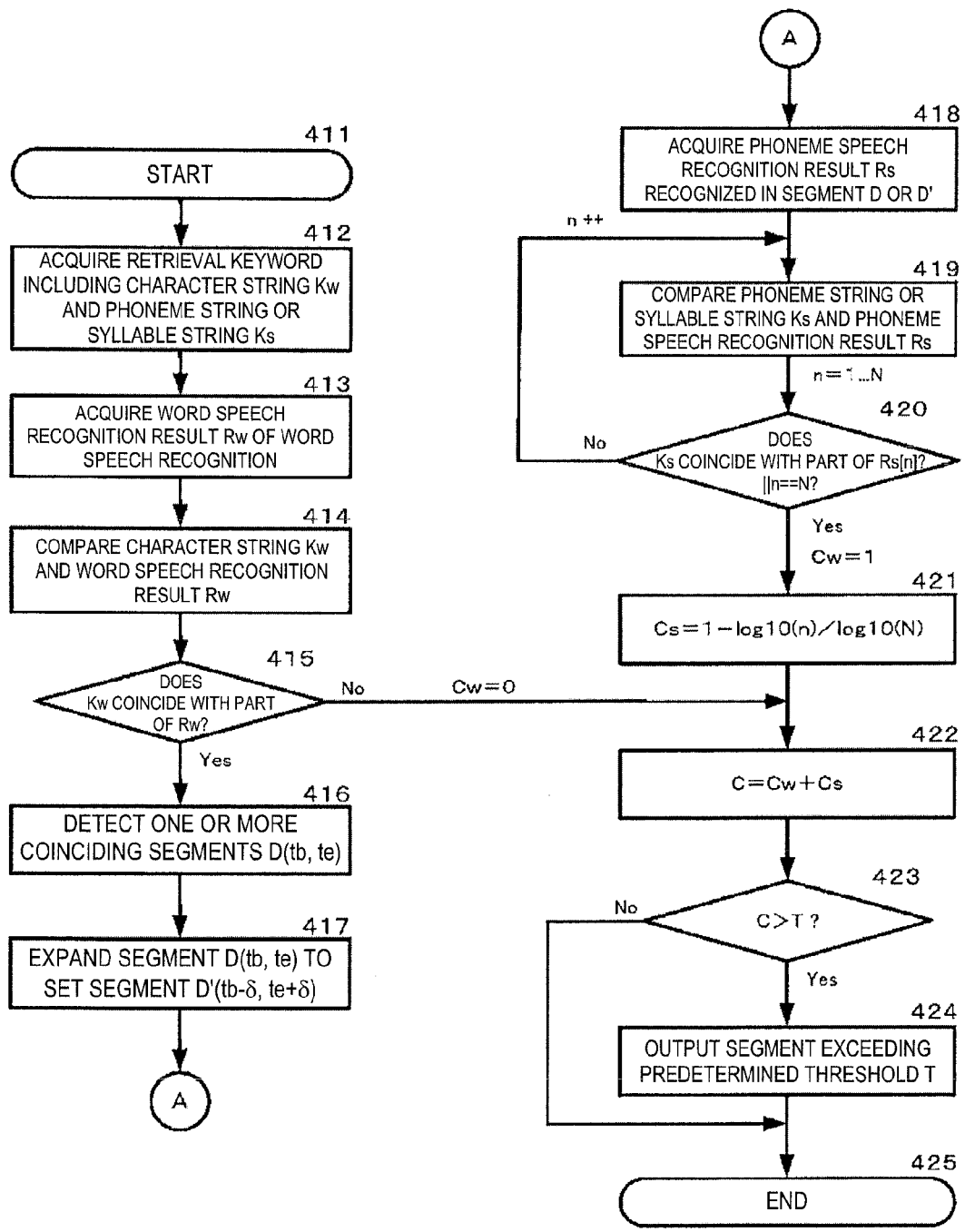
FIG. 4B shows a flow chart for performing keyword retrieval (example of partially using N-best recognition results) from the speech data according to the embodiment of the present invention.

FIG. 4B shows a flow chart for performing keyword retrieval of the speech data (example of partially using N-best recognition result) according to the embodiment of the present invention. In the description of the flow chart shown in FIG. 4B, "speech retrieval apparatus" denotes the speech retrieval apparatus (101) or the speech retrieval apparatus (121).

In step 411, the speech retrieval apparatus (101, 121) starts the process of performing keyword retrieval from the speech data shown in step 402 of FIG. 4A.

In step 412, the speech retrieval apparatus (101, 121) acquires a retrieval keyword for performing the keyword retrieval from, for example, a storage medium storing a retrieval keyword. The retrieval keyword includes the character string Kw of the retrieval keyword and the phoneme string or syllable string Ks of the keyword to be retrieved. The character string of the retrieval keyword can be, for example, text data input by the user or text data of speech data input by the user.

In step 413, the speech retrieval apparatus (101, 121) acquires the word speech recognition result Rw of the word speech recognition with words as recognition units performed for the speech data to be retrieved. The speech retrieval apparatus (101, 121) reads the word speech recognition result Rw from, for example, a storage medium (e.g., the storage medium (108) shown in FIG. 1A or the storage medium (128) shown in FIG. 1B) readable by the speech retrieval apparatus (101, 121) or downloads the word speech recognition result Rw from another apparatus (e.g., computer or network attached storage) accessible by the speech retrieval apparatus (101, 121) through a network.

In step 414, the speech retrieval apparatus (101, 121) compares the character string Kw of the retrieval keyword acquired in step 412 and the character string that is the word speech recognition result Rw as a word string acquired in step 413. More specifically, the speech retrieval apparatus (101, 121) determines whether the character string Kw of the retrieval keyword coincides with at least part of the character string that is the word speech recognition result Rw acquired in step 413.

In step 415, the speech retrieval apparatus (101, 121) advances the process to step 416 according to the coincidence of the character string Kw with at least part of the character string that is the word speech recognition result Rw as a result of the comparison of step 414. More specifically, the speech retrieval apparatus (101, 121) finds the segment D coinciding with the character string Kw in the word speech recognition result Rw in step 415. On the other hand, the speech retrieval apparatus (101, 121) advances the process to step 422 according to the non-coincidence of the character string Kw with the character string in the word speech recognition result Rw.

In step 416, the speech retrieval apparatus (101, 121) detects one or more candidate segments D (tb, te) in which the character string Kw coincides with at least part of the character string that is the word speech recognition result Rw in the speech data. Here, tb denotes the start time of the segment D in which the coinciding character string appears in the speech data, and te denotes the end time of the segment D in which the coinciding character string appears in the speech data.

Step 417 is an arbitrary step. In step 417, the speech retrieval apparatus (101, 121) expands the start and end of one or both ends of the start time and the end time of the segment D (tb, te) detected in step 416 by a predetermined time to set the segment D' (tb−δ, te+δ). The value of δ is an arbitrary time. The values −δ and +δ may be the same or different. The reason that the start and end of one or both ends of the start time and the end time of the segment D (tb, te) are extended by the predetermined time is to increase the accuracy of the comparison with the phoneme string or syllable string Ks in the retrieval keyword in step 419 described below.

In step 418, the speech retrieval apparatus (101, 121) acquires the phoneme speech recognition result Rs recognized in the segment D (tb, te) (when step 417 is not executed) or the segment D' (tb−δ, te+δ). The phoneme speech recognition result Rs can be obtained by extracting a phoneme speech recognition result associated with the segment D or the segment D' from the phoneme speech recognition result of the speech data to be retrieved or can be a phoneme speech recognition result obtained by directly performing the phoneme speech recognition of the speech data associated with the segment D or the segment D'.

In step 419, the speech retrieval apparatus (101, 121) compares the phoneme string or syllable string Ks in the retrieval keyword acquired in step 412 and the phoneme speech recognition result Rs that is the phoneme string acquired in step 418. More specifically, the speech retrieval apparatus (101, 121) determines whether the phoneme string or syllable string Ks in the retrieval keyword coincides with at least part of the phoneme string that is the phoneme speech recognition result Rs associated with the segment D detected in step 416 or the segment D' acquired in step 417.

In step 420, the speech retrieval apparatus (101, 121) advances the process to step 421 according to the coincidence of the phoneme string or syllable string Ks in the retrieval keyword with at least part of the phoneme string that is the phoneme speech recognition result Rs as a result of the comparison of step 419. More specifically, the speech retrieval apparatus (101, 121) finds a part coinciding with the phoneme string Ks in the phoneme speech recognition result Rs with rank n in the N-best phoneme speech recognition result in step 420. It should be understood that n==N denotes a loop up to N times, until n reaches N. On the other hand, the speech retrieval apparatus (101, 121) increments the rank n of the N-best phoneme speech recognition result by +1 if not Rs[n]==Ks∥n==N and returns the process to step 419 to repeat step 419 and step 420.

In step 421, the speech retrieval apparatus (101, 121) calculates the score Cs (0<=1) as an index indicating a likelihood of the segment D or the segment D' based on the comparison in step 419 and step 420 of the phoneme speech recognition result according to, for example, the following formula:

$Cs = 1 - \log 10(n)/\log 10(N)$

The evaluation of the likelihood of the segment D or the segment D' is based on a method of evaluation using the N-best phoneme speech recognition results Rs (e.g., indicated by Rs[1 . . . N]) and the rank n (1<n<N; N is maximum number of N-best) of coincidence with the phoneme string or syllable string Ks in the retrieval keyword.

For example, if N (maximum number) of N-best is 1000,
when n=1, then Cs=1−0/3=1,
when n=10, then Cs=1−1/3=0.66,
when n=100, then Cs=1−2/3=0.50, and
when n=800, then Cs=1−2.9/3=0.03.
Therefore, the value of Cs increases with an increase in the rank n. More specifically, the closer the value of Cs to 1, the higher the reliability of the segment.

In step 422, the speech retrieval apparatus (101, 121) adds the value of Cw from the result of comparison in step 415 (Cw=0 if there is no coinciding segment in the word speech recognition result) or from the result of comparison in step 420 (Cw=1 if there is a coinciding segment in the word speech recognition result) and the calculated Cs to calculate a score C.

For example, in a case of coincidence with a phoneme string in a lower rank of N-best (e.g., n=800), the score C is Cw (=1)+Cs (=0.03)=1.03 even if the phoneme string or syllable string Ks in the retrieval keyword coincides with the phoneme speech recognition result Rs[800], and the reliability of the segment is low. Meanwhile, for example, in a case of coincidence with a phoneme string in an upper rank of N-best (e.g., n=1), the score C is Cw (=1)+Cs (=1)=2, and the reliability of the segment is high.

In step 423, the speech retrieval apparatus (101, 121) determines whether the score C calculated in step 422 exceeds a predetermined threshold T. The speech retrieval apparatus (101, 121) advances the process to step 424 if the score C exceeds the predetermined threshold T. On the other hand, the speech retrieval apparatus (101, 121) advances the process to an end step 425 if the score C does not exceed the predetermined threshold T.

The user can appropriately designate the threshold T. The threshold T can be set to a value close to 2 in order to output a highly reliable segment. On the other hand, the threshold T can be set to a value close to 1 in order to detect a large number of segments by sacrificing some reliability.

In step 424, the speech retrieval apparatus (101, 121) outputs the segment exceeding the predetermined threshold if the score C exceeds the predetermined threshold T. The output segment is a segment in which the retrieval keyword in the speech data is specified. The output of the segment can be, for example, output of time information of the segment D or the segment D', output of the speech data of the segment D or the segment D' (phoneme data may be attached), or output of text data of the speech data of the segment D or the segment D'.

In step 425, the speech retrieval apparatus (101, 121) ends the process of performing the keyword retrieval of the speech data.

Figure 4C:
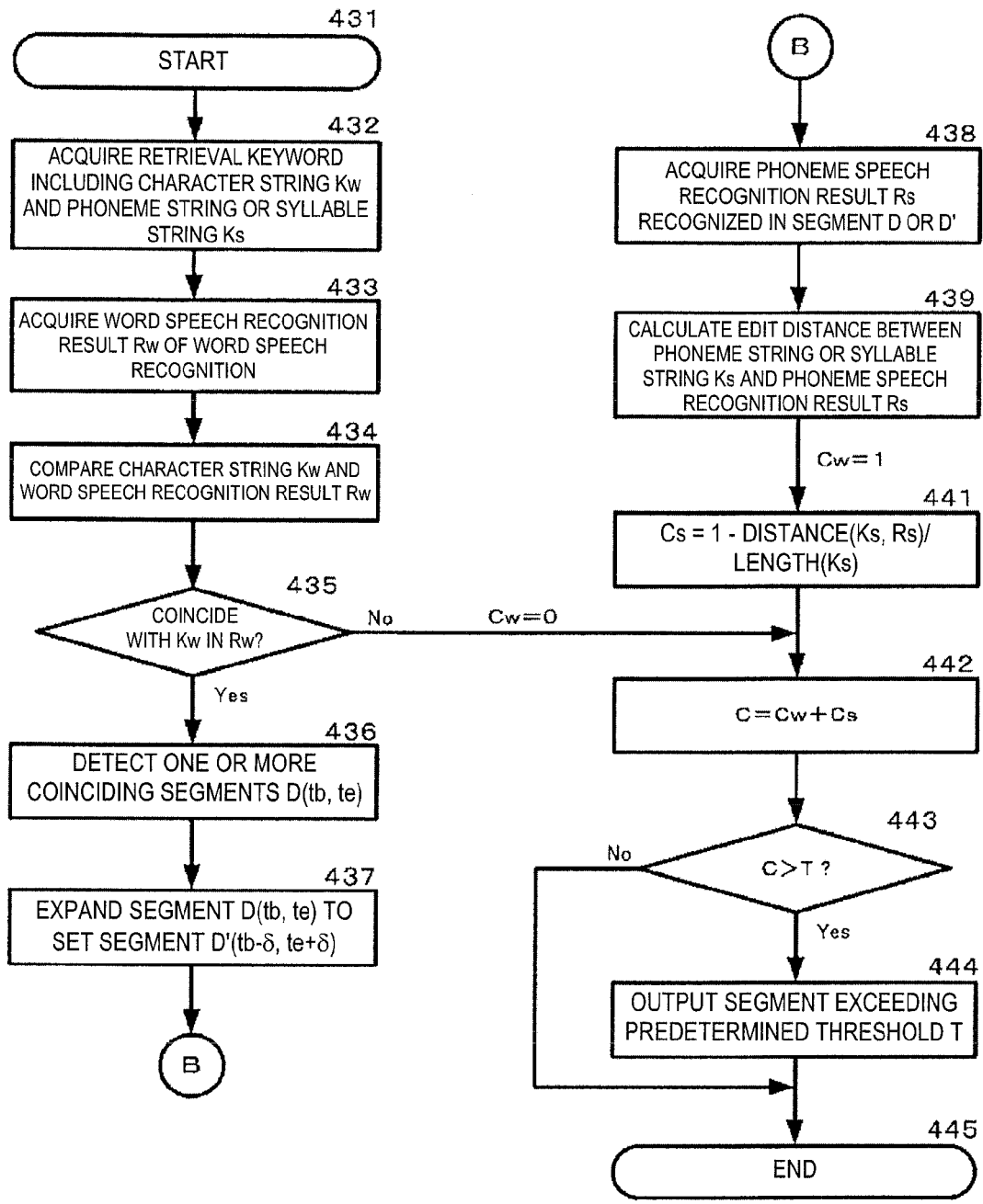
FIG. 4C shows a flow chart for performing keyword retrieval (example of partially using 1-best recognition result and edit distance) from the speech data according to the embodiment of the present invention.

FIG. 4C shows a flow chart for performing keyword retrieval of the speech data (e.g., partially using 1-best recognition result and edit distance) according to the embodiment of the present invention. In the description of the flow chart shown in FIG. 4C, "speech retrieval apparatus" denotes the speech retrieval apparatus (101) or the speech retrieval apparatus (121).

Steps 431 to 438 are the same as steps 411 to 418 shown in FIG. 4B, respectively. Therefore, see the description of steps 411 to 418 for the description of steps 431 to 438, respectively.

In step 439, the speech retrieval apparatus (101, 121) calculates the edit distance between the phoneme string or syllable string Ks in the retrieval keyword and the phoneme speech recognition result Rs recognized in the segment D (tb, te) acquired in step 438 (when step 417 is not executed) or the segment D' (tb−δ, te+δ) (see FIG. 2C described above). The edit distance is also called Levenshtein distance. The edit distance can be calculated by, for example, using matching by dynamic programming (DP Matching; Dynamic Programming Matching). Since the similarity of the phoneme string increases with a decrease in the edit distance, it can be stated that the reliability of the segment is high.

In step 441, the speech retrieval apparatus (101, 121) calculates the score Cs (0<=1), which is an index indicating the likelihood of the segment D or the segment D' in the phoneme speech recognition result, from the edit distance calculated in step 439 according to the following formula, for example:

$Cs = 1 - \text{edit distance}(Ks, Rs)/\text{length}(Ks)$

In step 442, the speech retrieval apparatus (101, 121) adds the value of Cw from the result of comparison in step 435

(Cw=0 if there is no coinciding segment in the word speech recognition result) or from the path from step 439 (Cw=1 if there is a coinciding segment in the word speech recognition result) and the calculated Cs to calculate the score C.

Steps 443 to 445 are the same as steps 423 to 425 shown in FIG. 4B, respectively. Therefore, see the description of steps 423 to 425 for the description of steps 443 to 445, respectively.

Figure 5A:
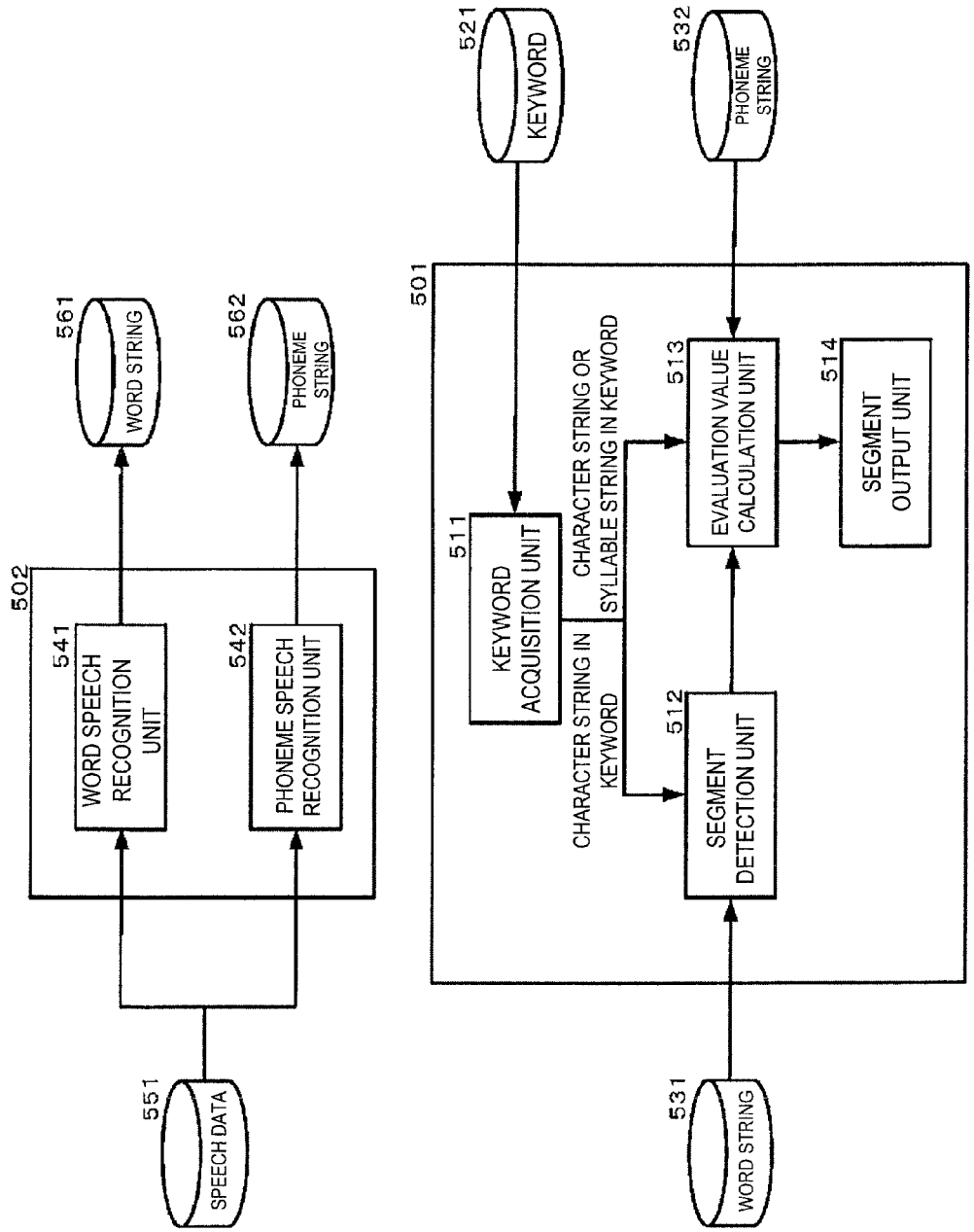
FIG. 5A is a diagram showing an example of a functional block diagram of a computer that preferably includes the hardware configuration according to FIG. 1A or FIG. 1B and that carries out the embodiment of the present invention according to the flow chart shown in FIG. 4A or FIG. 4B.
Figure 5B:
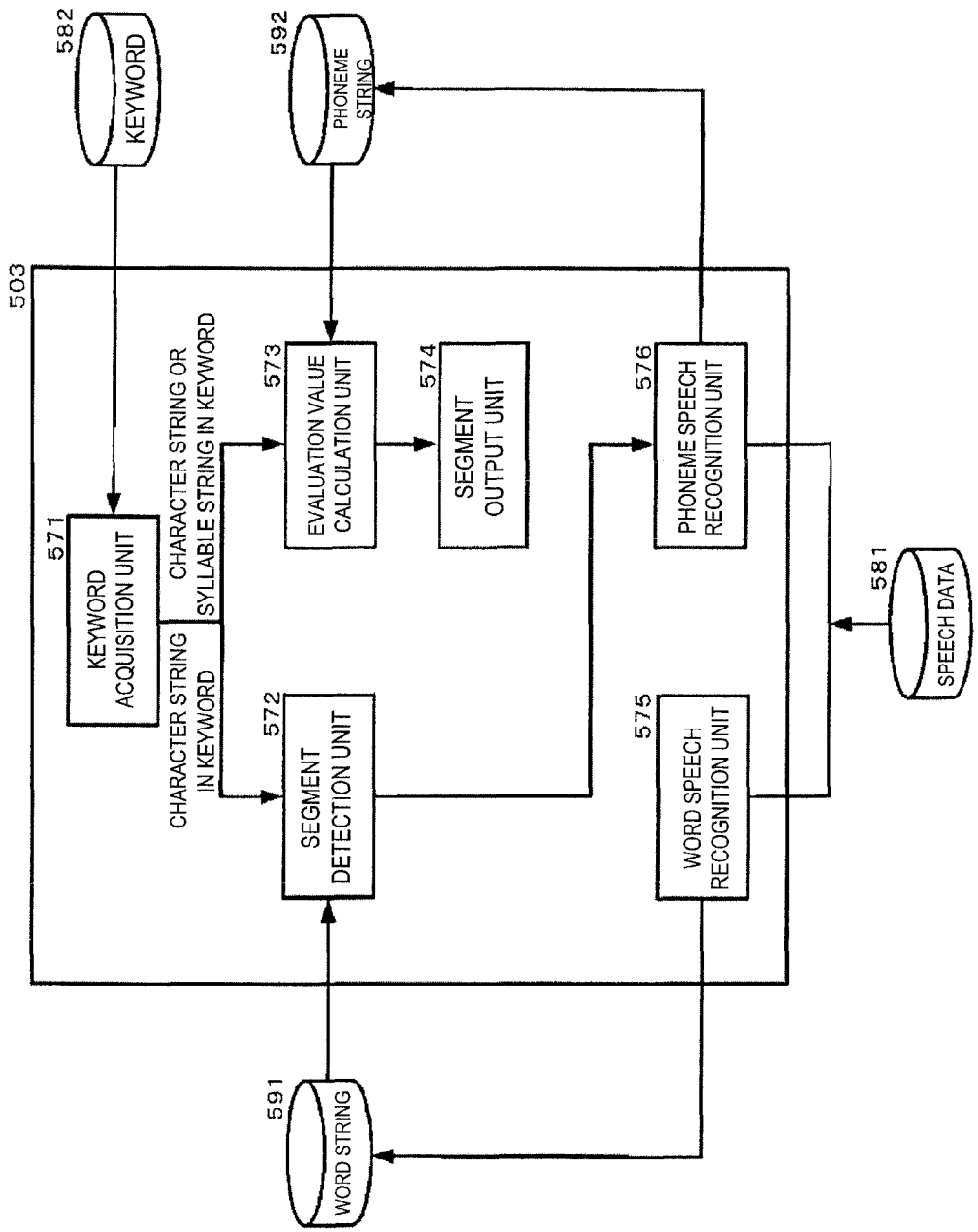
FIG. 5B is a diagram showing an example of a functional block diagram of a computer that preferably includes the hardware configuration according to FIG. 1A or FIG. 1B and that carries out the embodiment of the present invention according to the flow chart shown in FIG. 4A or FIG. 4B.

FIG. 5A and FIG. 5B are diagrams showing examples of functional block diagrams of a computer that preferably includes the hardware configuration according to FIG. 1A or FIG. 1B and that carries out the embodiment of the present invention according to the flow chart shown in FIG. 4A or 4B. Hereinafter, "unit" may be read as "means".

The embodiment shown in FIG. 5A is an example in which a speech retrieval apparatus (501) itself does not perform the word speech recognition and the phoneme speech recognition of the speech data to be retrieved. Meanwhile, the embodiment shown in FIG. 5B is an example in which a speech retrieval apparatus (503) itself performs the word speech recognition and the phoneme speech recognition of the voice data to be retrieved.

The embodiment shown in FIG. 5A will be described below.

The speech retrieval apparatus (501) can correspond to the speech retrieval apparatus (101) shown in FIG. 1A and the speech retrieval apparatus (121) shown in FIG. 1B.

The speech retrieval apparatus (501) can be an apparatus that executes the steps of the flow chart shown in FIG. 4B.

As described, the speech retrieval apparatus (501) itself does not perform the word speech recognition and the phoneme speech recognition of speech data (551) in the embodiment shown in FIG. 5A. Therefore, an electronic apparatus (502) other than the speech retrieval apparatus (501) processes the word speech recognition and the phoneme speech recognition of the speech data (551).

The speech retrieval apparatus (501) has the configuration, such as the CPU (102), the main memory (103), and the disk (108), shown in the speech retrieval apparatus (101) of FIG. 1A. Alternatively, the speech retrieval apparatus (501) has the configuration, such as the CPU (132), the main memory (133), and the disk (128), shown in the speech retrieval apparatus (121) of FIG. 1B.

The speech retrieval apparatus (501) includes a keyword acquisition unit (511), a segment detection unit (512), an evaluation value calculation unit (513), and a segment output unit (514).

The keyword acquisition unit (511) acquires a retrieval keyword designated by a character string, and a phoneme string or a syllable string, from, for example, a storage medium (e.g., keyword database) (521) storing the retrieval keyword.

The keyword acquisition unit (511) can provide the character string of the retrieval keyword to the segment detection unit (512) and can provide the phoneme string or the syllable string in the retrieval keyword to the evaluation value calculation unit (513).

The keyword acquisition unit (511) can execute step 412 shown in FIG. 4B and step 432 shown in FIG. 4C.

The segment detection unit (512) compares character strings (561, 531) that are recognition results of the word speech recognition with words as recognition units performed for the speech data (551) to be retrieved and the character string of the keyword (521) to detect one or more coinciding segments. The segment detection unit (512) can acquire the character string (word string) that is a recognition result of the word speech recognition from, for example, a storage medium (e.g., word string database) (531) storing the character string that is the recognition result.

The segment detection unit (512) can execute steps 413 to 417 shown in FIG. 4B and steps 433 to 437 shown in FIG. 4C.

The evaluation value calculation unit (513) uses the phoneme string or the syllable string of the keyword to evaluate the phoneme string or the syllable string that is a phoneme string or a syllable string recognized in each of one or more segments detected by the segment detection unit (512) and that is the recognition result of the phoneme speech recognition with phonemes or syllable as recognition units performed for the speech data (551) and calculates an evaluation value of each of the one or more segments. The evaluation value calculation unit (513) can acquire the phoneme string or the syllable string recognized in each segment from, for example, a storage medium (e.g., phoneme string database) (532) storing the phoneme string or the syllable string.

The evaluation value calculation unit (513) can compare the phoneme string or the syllable string that is the N-best recognition result of the phoneme speech recognition with phonemes or syllables as recognition units performed for the speech data associated with each of one or more segments detected by the segment detection unit (512) and the phoneme string of the keyword to set the rank of the coinciding N-best recognition result as the evaluation value.

The evaluation value calculation unit (513) can set, as the evaluation value, the edit distance between the phoneme string or the syllable string that is the 1-best recognition result of the phoneme speech recognition with phonemes or syllables as recognition units performed for the speech data associated with each of one or more segments detected by the segment detection unit (512) and the phoneme string or the syllable string of the keyword.

The evaluation value calculation unit (513) can execute steps 418 to 421 shown in FIG. 4B as well as steps 438, 439, and 441 shown in FIG. 4C.

The segment output unit (514) outputs a segment in which the evaluation value calculated by the evaluation value calculation unit (513) exceeds a predetermined threshold.

The segment output unit (514) executes steps 422 and 423 shown in FIG. 4B and steps 442 and 443 shown in FIG. 4C.

The electronic apparatus (502) can be an apparatus that executes the steps of the flow chart shown in FIG. 4A.

The electronic apparatus (502) includes a word speech recognition unit (541) and a phoneme speech recognition unit (542).

The word speech recognition unit (541) performs word speech recognition of the speech data (551) to be retrieved, with words as recognition units. The word speech recognition unit (541) can store the character string (word string) that is the recognition result of the word speech recognition in, for example, a storage medium (e.g., word string database) (561) storing word strings that is accessible by the electronic apparatus (502). The storage medium (561) storing the word strings may be the same as the storage medium (531) storing the word strings. A copy of the storage medium (561) storing the word strings can be the storage medium (531) storing the word strings.

The phoneme speech recognition unit (542) performs phoneme speech recognition of the speech data (551) to be retrieved, with phonemes or syllables as recognition units. The phoneme speech recognition unit (542) can store the phoneme string or the syllable string that is the recognition result of the phoneme speech recognition in, for example, a storage medium (e.g., phoneme string database) (562) storing phoneme strings that is accessible by the electronic apparatus (502). The storage medium (562) storing the phoneme strings may be the same as the storage medium (532) storing the phoneme strings. A copy of the storage medium (562) storing the word strings may be the storage medium (532) storing the word strings.

Hereinafter, the embodiment shown in FIG. 5B will be described.

The speech retrieval apparatus (503) can correspond to the speech retrieval apparatus (101) shown in FIG. 1A or the speech retrieval apparatus (121) shown in FIG. 1B.

The speech retrieval apparatus (503) can be an apparatus that executes the steps of the flow chart shown in FIG. 4A and the steps of the flow chart shown in FIG. 4B.

As described, in the speech retrieval apparatus (503), the speech retrieval apparatus (503) itself performs the word speech recognition and the phoneme speech recognition of speech data (581).

The speech retrieval apparatus (503) has the configuration, such as the CPU (102), the main memory (103), and the disk (108), shown in the speech retrieval apparatus (101) of FIG. 1A. Alternatively, the speech retrieval apparatus (503) includes the configuration, such as the CPU (132), the main memory (133), and the disk, (128), shown in the speech retrieval apparatus (121) of FIG. 1B.

The speech retrieval apparatus (503) includes a keyword acquisition unit (571), a segment detection unit (572), an evaluation value calculation unit (573), a segment output unit (574), a word speech recognition unit (575), and a phoneme speech recognition unit (576).

The keyword acquisition unit (571), the segment detection unit (572), the evaluation value calculation unit (573), and the segment output unit (574) shown in FIG. 5B correspond to the keyword acquisition unit (511), the segment detection unit (512), the evaluation value calculation unit (513), and the segment output unit (514) shown in FIG. 5A, respectively. Therefore, see the description of the keyword acquisition unit (511), the segment detection unit (512), the evaluation value calculation unit (513), and the segment output unit (514) for the description of the keyword acquisition unit (571), the segment detection unit (572), the evaluation value calculation unit (573), and the segment output unit (574), respectively. The speech data (551), the storage medium (521) storing the retrieval keyword, the storage medium (561) storing the word string, and the storage medium (562) storing the phoneme string shown in FIG. 5A in the description above shall be read as the speech data (581), a storage medium (582) storing the retrieval keyword, a storage medium (591) storing the word string, and a storage medium (592) storing the phoneme string shown in FIG. 5B, respectively.

The speech retrieval apparatus (503) further includes the word speech recognition unit (575) and the phoneme speech recognition unit (576).

Like the word speech recognition unit (541) shown in FIG. 5A, the word speech recognition unit (575) performs the word speech recognition of the speech data (581) to be retrieved, with words as recognition units. The word speech recognition unit (575) can store the character string (word string) that is the recognition result of the word speech recognition in, for example, the storage medium (531) storing word strings that is accessible by the speech retrieval apparatus (503).

Like the phoneme speech recognition unit (542) shown in FIG. 5A, the phoneme speech recognition unit (576) can perform the phoneme speech recognition of the speech data (581) to be retrieved, with phonemes or syllables as recognition units. The phoneme speech recognition unit (576) can store the phoneme string or the syllable string that is the recognition result of the phoneme speech recognition in, for example, the storage medium (592) storing phoneme strings that is accessible by the speech retrieval apparatus (503).

The phoneme speech recognition unit (576) can perform the phoneme speech recognition with phonemes or syllables as recognition units for the speech data associated with each of one or more segments detected by the segment detection unit (572).

Figure 3:
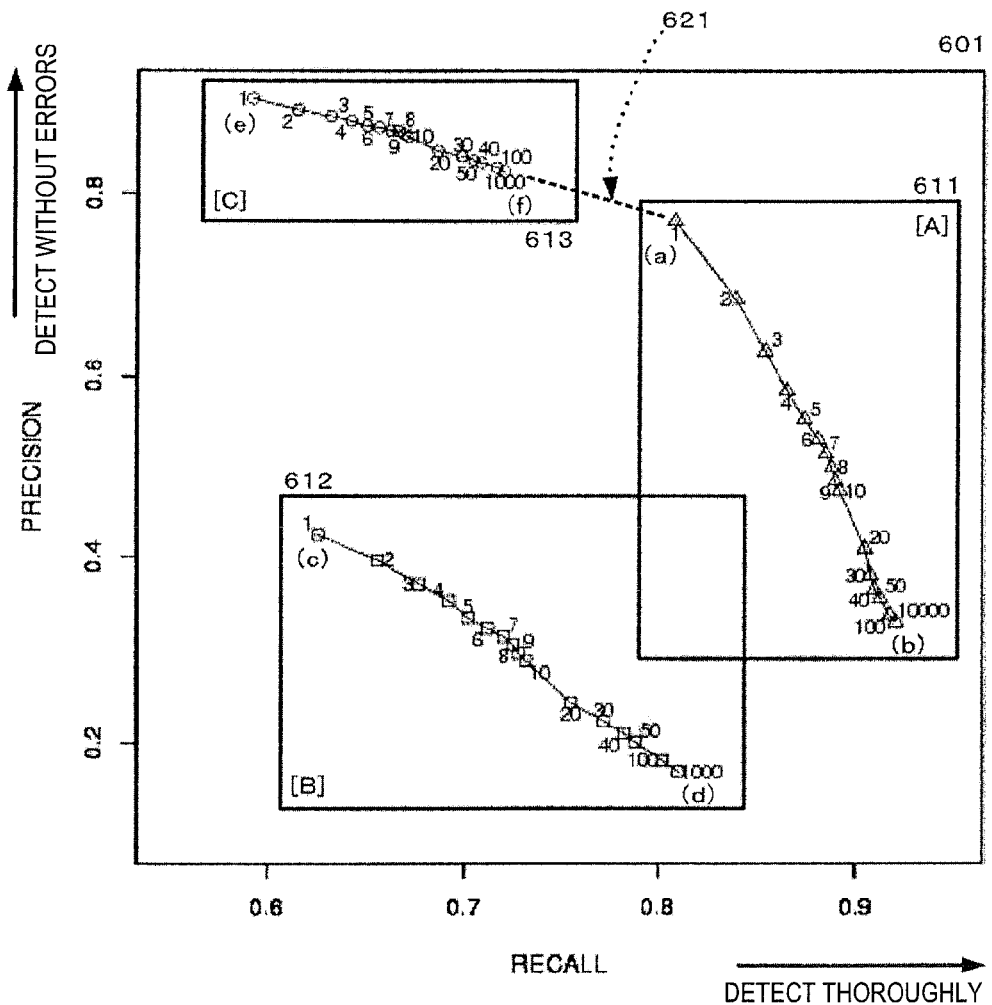
FIG. 3 shows retrieval performances obtained as a result of conducting keyword retrieval experiments for test speech data according to the embodiment of the present invention and conventional techniques.

FIG. 3 shows retrieval performances obtained as a result of conducting keyword retrieval experiments of test speech data according to the embodiment of the present invention and the conventional techniques.

EXAMPLE (1) A retrieval experiment of a retrieval keyword for test speech data is conducted according to the embodiment of the present invention (e.g., flow charts shown in FIG. 4A and FIG. 4B).

(2) Test conditions are as follows:
1) The number of files of test speech data: 110 files (Japanese);
2) Duration of calls: 29.6 hours;
3) The number of speech segments: 21K segments
4) Retrieval keywords: 38 types of retrieval keywords with lengths of 2 to 10 words (4 to 20 phonemes). Each keyword is provided with a character string and a phoneme string.
5) In the test data, it is recognized that recognition results of words include 179K words, and the number of keywords included is 3248.

(3) Segments in which the word speech recognition result (1-best) coincides with the character string of the retrieval keyword and in which the phoneme speech recognition result (N-best (N=1000, N denotes maximum value of n in N-best)) recognized in the coinciding segment coincides with the phoneme string in the retrieval keyword are output.

(4) Results of experiment are indicated in a graph (601, [C] (e) to (f)) and a chart (602, (e) and (f)) of FIG. 3, (e) illustrating a case of n=1, (f) illustrating a case of n=1000.

The graph (601) indicates the recall on the horizontal axis and the precision on the vertical axis. In the graph (601), numbers 1 to 1000 on the sides of plot points indicate N of N-best.

The chart (602) illustrates recall, precision, and F-measure (F-measure, also called F-number) of (a) to (b) indicating plots in comparative example 1, (c) to (d) indicating plots in comparative example 2, (e), and (f) in the graph (601).

The F-measure is a harmonic means of the precision and the recall and is calculated according to a formula (603) shown in FIG. 3. The higher the F-measure, the better the performance of retrieval.

Comparative Example 1

(1) A retrieval experiment of retrieval keyword for the test speech data is conducted according to only the word speech recognition that is a conventional technique.

(2) The test conditions 1) to 5) are the same as in the example.

(3) Segments in which the word speech recognition result N-best (N=1000) coincides with the character string of the retrieval keyword are output.

(4) Results of experiment are indicated in a graph (611, [A](a) to (b)) and the chart (602, (a) and (b)) of FIG. 3, (a) illustrating a case of n=1, (b) illustrating a case of n=1000.

Comparative Example 2

(1) A retrieval experiment of retrieval keyword for the test speech data is conducted according to only the phoneme speech recognition that is a conventional technique.

(2) The test conditions 1) to 5) are the same as in the example.

(3) Segments in which the phoneme speech recognition result N-best (N=1000) coincides with the phoneme string in the retrieval keyword are output.

(4) Results of experiment are indicated in a graph (612, [B](c) to (d)) and the chart (602, (c) and (d)) of FIG. 3, (c) illustrating a case of n=1, (d) illustrating a case of n=1000.

The range that can be covered by the word speech recognition of comparative example 1 (word speech recognition) is [A], and the range that can be covered by the phoneme speech recognition of comparative example 2 (phoneme speech recognition) is [B]. Meanwhile, the range that can be covered by the example is [C], and the precision (90% in (e) n=1, 82% in (f) n=1000) is higher than the precision in comparative example 1 ((a) and (b)) and the precision in comparative example 2 ((c) and (d)).

As shown in the graph (601) of FIG. 3, the value of n of N-best can be adjusted to continuously change the precision and the recall in the segment of the results (e) to (f) in the example. Although N=1000 in the present example, N can be ∞, and the value of n corresponding to the threshold T can be ∞ to obtain results with continuously changing precision and recall in a segment (621) from (f) to (a). The score Cs is calculated by n as indicated in step 421, and the score C is calculated in step 422. As shown in the graph (601), it can be understood that the value of n and the precision are negatively correlated and that the value of n and the recall are positively correlated. More specifically, there is a relationship that an increase in the threshold T reduces the recall and increases the precision and that a decrease in the threshold T increases the recall and reduces the precision.

In [A](a) to (b) of comparative example 1, the F-measure is largely changed 0.789 (n=1)→0.486 (n=1000), and in [B](c) to (d) of comparative example 2, the F-measure is largely changed 0.506 (n=1)→0.279 (n=1000). Meanwhile, the F-measure is 0.715 (n=1)→0.768 (n=1000) in [C](e) to (f) of the example, and the retrieval performance is only slightly changed by the value of N. The fact that the retrieval performance is only slightly changed by the value of N indicates a high utility of the present method, in which the retrieval performance is not dependent on parameters in the retrieval.

The invention claimed is:

1. A method for speech retrieval, comprising:
    detecting one or more coinciding segments for speech data by comparing a character string of a recognition result and a character string of a keyword, the keyword being designated by the character string and a phoneme string or a syllable string;
    calculating an evaluation value of each of the one or more coinciding segments using the phoneme string or the syllable string of the keyword to evaluate a phoneme string or a syllable string recognized in each of the one or more coinciding segments and that is a recognition result of phoneme speech recognition, wherein the phoneme string or the syllable string associated with each of the coinciding segments is a phoneme string or a syllable string associated with a segment in which a start and an end of the segment is expanded by a predetermined time; and
    outputting a segment in which the calculated evaluation value exceeds a predetermined threshold.

2. The method according to claim 1, wherein the recognition result of word speech recognition includes words as recognition units performed for the speech data.

3. The method according to claim 1, wherein the recognition result of phoneme speech recognition includes phonemes or syllables as recognition units performed for the speech data.

4. The method according to claim 1, wherein calculating comprises comparing a phoneme string or a syllable string that is an N-best recognition result of phoneme speech recognition with phonemes or syllables as recognition units performed for speech data associated with each of the detected one or more coinciding segments and the phoneme string of the keyword to set a rank of the coinciding N-best recognition result as the evaluation value.

5. The method according to claim 1, wherein calculating comprises setting, as the evaluation value, an edit distance between a phoneme string or a syllable string that is a 1-best recognition result of phoneme speech recognition with phonemes or syllables as recognition units performed for speech data associated with each of the detected one or more coinciding segments and the phoneme string or the syllable string of the keyword.

6. The method according to claim 5, wherein the edit distance is a distance matched by matching based on dynamic programming.

7. The method according to claim 1, further comprising performing word speech recognition of the speech data to be retrieved, with words as recognition units.

8. The method according to claim 1, further comprising performing phoneme speech recognition of the speech data associated with each of the detected one or more coinciding segments, with phonemes or syllables as recognition units.

9. The method according to claim 1, further comprising performing phoneme speech recognition of the speech data to be retrieved, with phonemes or syllables as recognition units.

10. The method of claim 1, wherein the calculating the evaluation value of each of the one or more coinciding segments further includes using the character string of the keyword to evaluate the character string in each of the detected one or more coinciding segments.

11. The method of claim 1, further comprising adjusting the predetermined threshold to alter at least one of a precision value and a recall value of the output segment, the precision value being positively correlated with the predetermined threshold and the recall value being negatively correlated with the predetermined threshold.

12. The method of claim 11, wherein the precision value is a ratio of retrieval results satisfying a retrieval request to all documents satisfying the retrieval request.

13. The method of claim 11, wherein the recall value is a ratio of retrieval results satisfying a retrieval request to all retrieval results.

* * * * *